United States Patent
Asai et al.

(10) Patent No.: US 6,753,858 B2
(45) Date of Patent: Jun. 22, 2004

(54) IMAGE DISPLAY APPARATUS, IMAGE DISPLAYING METHOD AND RECORDING MEDIUM

(75) Inventors: Yoshimi Asai, Osaka (JP); Noriyuki Koyama, Kyoto (JP); Satoshi Okada, Kyoto (JP)

(73) Assignee: Sharp Kabushiki Kaisha, Osaka (JP)

( * ) Notice: Subject to any disclaimer, the term of this patent is extended or adjusted under 35 U.S.C. 154(b) by 258 days.

(21) Appl. No.: 09/862,509

(22) Filed: May 23, 2001

(65) Prior Publication Data

US 2002/0005848 A1 Jan. 17, 2002

(30) Foreign Application Priority Data

May 23, 2000  (JP) ........................................ 2000-152209

(51) Int. Cl.[7] ............................................... G06T 15/00
(52) U.S. Cl. ...................................................... 345/419
(58) Field of Search ............................ 345/2.1, 16, 24, 345/214, 419, 440, 443, 589, 613, 694; 313/484, 485, 489, 495, 496, 502, 582; 283/72; 382/164, 232; 358/426.04, 462, 539

(56) References Cited

U.S. PATENT DOCUMENTS

| | | | | |
|---|---|---|---|---|
| 4,808,988 A | * | 2/1989 | Burke et al. | 345/16 |
| 5,818,966 A | * | 10/1998 | Prasad et al. | 382/232 |
| 6,292,166 B1 | * | 9/2001 | Palmer et al. | 345/589 |
| 6,479,929 B1 | * | 11/2002 | Knabenbauer | 313/484 |
| 6,542,161 B1 | * | 4/2003 | Koyama et al. | 345/589 |

* cited by examiner

Primary Examiner—Mark Zimmerman
Assistant Examiner—Lance W. Sealey
(74) Attorney, Agent, or Firm—Birch, Stewart, Kolasch & Birch, LLP

(57) ABSTRACT

An image display apparatus including: a 3D display device and a control section for controlling the 3D display device, wherein the control section obtains a drawing pattern corresponding to 2D image data, and displays the drawing pattern on the 3D display device. The drawing pattern is constructed in such a manner that when the drawing pattern is displayed on the 3D display device, the drawing pattern exhibits a pseudo color which is identical to a color which would be exhibited when the 2D image data is displayed by a 2D display device.

14 Claims, 34 Drawing Sheets

0=ON   1=OFF

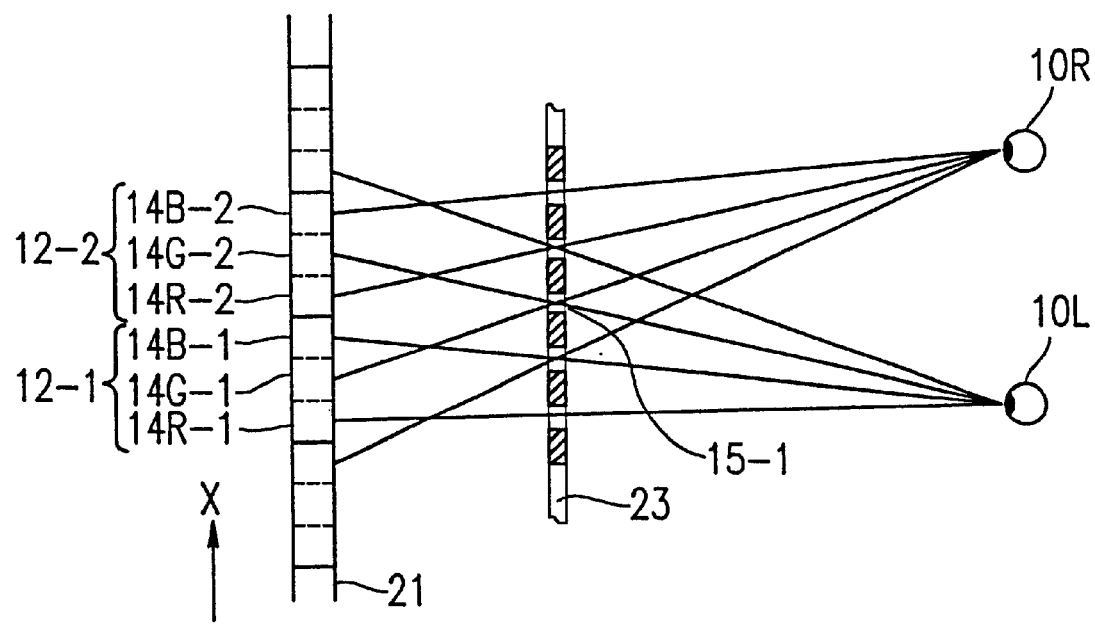

FIG.11

Luminance table 32b

| Color element level | Luminance level | | |
|---|---|---|---|
| | R | G | B |
| 8 | 0 | 0 | 0 |
| 7 | 31 | 31 | 31 |
| 6 | 63 | 63 | 63 |
| 5 | 95 | 95 | 95 |
| 4 | 127 | 127 | 127 |
| 3 | 159 | 159 | 159 |
| 2 | 191 | 191 | 191 |
| 1 | 223 | 223 | 223 |
| 0 | 255 | 255 | 255 |

FIG.12 Correction table 32c-1

1001: 0 8 0 8 8 8 0 8 0
1002: 0 8 0 8 8 8 8 8 8 8 0 8 0
1003: 0 8 0 8 8 8 - - 8 8 8 0 8 0   Twenty-two "8"s (3k+1)

2001: 0 2 5 7 8 8 7 5 2 0
2002: 0 2 5 7 8 8 7 5 5 7 8 8 7 5 2 0
2003: 0 2 5 7 8 8 - - 8 8 8 7 5 2 0   Twenty "8"s (3k-1)

Correction table 32c-2

$\swarrow$ 1700

Luminance table 32b-2

| Color element level | | Luminance level | | |
|---|---|---|---|---|
| | | R | G | B |
| | 8 | 0 | 0 | 0 |
| | 7 | 31 | 31 | 61 |
| | 6 | 63 | 63 | 93 |
| | 5 | 95 | 95 | 125 |
| | 4 | 127 | 127 | 147 |
| | 3 | 159 | 159 | 179 |
| | 2 | 191 | 191 | 201 |
| | 1 | 223 | 223 | 243 |
| | 0 | 255 | 255 | 255 |

FIG. 19B

Luminance table 32b-3

| Color element level | | Luminance level | | |
|---|---|---|---|---|
| | | R | G | B |
| | 8 | 0 | 0 | 0 |
| | 7 | 21 | 21 | 21 |
| | 6 | 43 | 43 | 43 |
| | 5 | 85 | 85 | 85 |
| | 4 | 137 | 137 | 137 |
| | 3 | 179 | 179 | 179 |
| | 2 | 211 | 211 | 211 |
| | 1 | 233 | 233 | 233 |
| | 0 | 255 | 255 | 255 |

Neighborhood processing table 32e-1

| Color element level |||||||||
|---|---|---|---|---|---|---|---|---|
| Sub-pixel −4 | Sub-pixel −3 | Sub-pixel −2 | Sub-pixel −1 | Skeletal portion | Sub-pixel 1 | Sub-pixel 2 | Sub-pixel 3 | Sub-pixel 4 |
| 0 | 2 | 4 | 6 | 8 | 6 | 4 | 2 | 0 |

FIG.29B

Neighborhood processing table 32e-2

| Color element level |||||||||
|---|---|---|---|---|---|---|---|---|
| Sub-pixel −4 | Sub-pixel −3 | Sub-pixel −2 | Sub-pixel −1 | Skeletal portion | Sub-pixel 1 | Sub-pixel 2 | Sub-pixel 3 | Sub-pixel 4 |
| 1 | 3 | 5 | 8 | 8 | 8 | 5 | 3 | 1 |

Data as stored in ROM ⟵3400

| Character code (0333) |
|---|
| 000000000000000000000000000000000000 |
| 000000000000000001000000000000000000 |
| 000000000000000010100000000000000000 |
| 000000000000000100010000000000000000 |
| 000000000000001000001000000000000000 |
| 000000000000010000000100000000000000 |
| 000000000000100000000010000000000000 |
| 000000000001000000000001000000000000 |
| 000000000011111111111111100000000000 |
| 000000000100000000000000010000000000 |
| 000000001000000000000000001000000000 |
| 000000010000000000000000000100000000 |

ON=0
OFF=1

IMAGE DISPLAY APPARATUS, IMAGE DISPLAYING METHOD AND RECORDING MEDIUM

BACKGROUND OF THE INVENTION

1. Field of the Invention

The present invention relates to: an image display apparatus which allows a two-dimensional (2D) image to be displayed on a three-dimensional (3D) display device which is capable of displaying 3D images; an image displaying method; and a recording medium.

2. Description of the Related Art

In the field of 3D display devices which present distinct images to the right eye and the left eye of a viewer to enable the perception of a depth dimension, methods are known which feature a parallax optics device provided in front of a display surface (see, for example, Japanese Laid-Open Publication No. 10-229567). Such conventional techniques may employ, for example, the display surface of a stripe-type liquid crystal display apparatus as a display surface, and a parallax barrier as a parallax optics device.

A 3D display device which incorporates a stripe-type liquid crystal display apparatus and a parallax barrier may be suitably used for information appliances such as personal computers.

By nature, information appliances such as personal computers are required to handle 2D images as well as 3D images.

Conventionally, however, 3D display devices have only been used for the purpose of displaying 3D images. No attention has been paid for the realization of an ability to display a 2D image on a 3D display device. As used herein, a "3D image" is defined as an image which allows a viewer to perceive a depth dimension. A "2D image" is defined as an image which does not allow a viewer to perceive a depth dimension. Examples of 2D images include characters (e.g., alphanumerical characters).

By using an information-appliance incorporating a 3D display device, it has conventionally been impossible to handle processing of 2D images, e.g., edition of text information.

SUMMARY OF THE INVENTION

An image display apparatus according to the present invention includes: a 3D display device and a control section for controlling the 3D display device, wherein the control section obtains a drawing pattern corresponding to 2D image data, and displays the drawing pattern on the 3D display device, the drawing pattern being constructed in such a manner that when the drawing pattern is displayed on the 3D display device, the drawing pattern exhibits a pseudo color which is identical to a color which would be exhibited when the 2D image data is displayed by a 2D display device.

In one embodiment of the invention, the 3D display device includes a plurality of pixels, each of the plurality of pixels including a plurality of sub-pixels which are arrayed along a predetermined direction; a corresponding one of a plurality of color elements is previously assigned to each of the plurality of sub-pixels; and the control section independently controls the plurality of sub-pixels based on the drawing pattern.

In another embodiment of the invention, the 2D image data is black/white binary image data.

In still another embodiment of the invention, the drawing pattern is obtained by converting the 2D image data according to a predetermined rule.

In still another embodiment of the invention, the drawing pattern is obtained by converting the 2D image data to a binary drawing pattern and converting the binary drawing pattern to a multi-value drawing pattern.

In still another embodiment of the invention, the image display apparatus further includes a memory for storing the drawing pattern corresponding to the 2D image data; and the drawing pattern is obtained by reading the drawing pattern corresponding to the 2D image data as stored in the memory.

In still another embodiment of the invention, the image display apparatus further includes a memory for storing skeleton data representing a skeletal shape of the 2D image data; and the drawing pattern is obtained by generating the drawing pattern based on the skeleton data.

In still another embodiment of the invention, intensity of each of the plurality of color elements is representable by a plurality of stepwise color element levels; each of the plurality of sub-pixels has one of the plurality of color element levels; and the control section adjusts a line width of the drawing pattern by adjusting the number of sub-pixels to be set at a maximum color element level based on the drawing pattern.

In still another embodiment of the invention, intensity of each of the plurality of color elements is representable by a plurality of stepwise color element levels; each of the plurality of sub-pixels has one of the plurality of color element levels; and the control section adjusts a line width of the drawing pattern by adjusting the color element levels of a predetermined number of sub-pixels based on the drawing pattern.

In another aspect of the invention, there is provided an image displaying method for displaying an image by using a 3D display device, including the steps of: obtaining a drawing pattern corresponding to 2D image data; and displaying the drawing pattern on the 3D display device, wherein the drawing pattern is constructed in such a manner that when the drawing pattern is displayed on the 3D display device, the drawing pattern exhibits a pseudo color which is identical to a color which would be exhibited when the 2D image data is displayed by a 2D display device.

In yet another aspect of the invention, there is provided a recording medium which is readable by a computer including a 3D display device and a control section for controlling the 3D display device, wherein the recording medium has recorded thereon a program for causing the control section to execute a process including the steps of: obtaining a drawing pattern corresponding to 2D image data; and displaying the drawing pattern on the 3D display device, wherein the drawing pattern is constructed in such a manner that when the drawing pattern is displayed on the 3D display device, the drawing pattern exhibits a pseudo color which is identical to a color which would be exhibited when the 2D image data is displayed by a 2D display device.

Thus, the invention described herein makes possible the advantages of: (1) providing an image display apparatus which allows a 2D image to be displayed on a 3D display device which is capable of displaying 3D images; (2) providing an image displaying method; and (3) providing a recording medium.

These and other advantages of the present invention will become apparent to those skilled in the art upon reading and understanding the following detailed description with reference to the accompanying figures.

BRIEF DESCRIPTION OF THE DRAWINGS

FIG. 1B is a plan view illustrating the 3D display device of FIG. 1A as viewed in the direction of arrow A shown in FIG. 1A.

FIG. 11 shows a luminance table 32b, which defines a relationship between the color element levels (level 8 to 0) and the luminance levels of sub-pixels.

FIG. 12 illustrates an exemplary correction table 32c-1, which may be used as a correction table 32c to be applied to a binary drawing pattern.

FIG. 14 illustrates a multi-value drawing pattern 1400 which is generated based on 2D image data representing the shape of the alphabetical letter "A".

FIG. 15 illustrates a correction table 32c-2 which is employed in the case where line thickness is to be controlled.

FIG. 16 shows another example of a correction table 32c-3 which is employed in the case where line thickness is to be controlled.

FIG. 17 illustrates an exemplary case where a pattern replacement has been performed by employing the correction table 32c-2 shown in FIG. 15 to generate a multi-value drawing pattern 1700.

FIG. 18 illustrates an exemplary case where a pattern replacement has been performed by employing the correction table 32c-3 shown in FIG. 16 to generate a multi-value drawing pattern 1800.

FIG. 19A illustrates a luminance table 32b-2 which defines a relationship between the color element levels (levels 8 to 0) and the luminance levels of sub-pixels.

FIG. 19B illustrates a luminance table 32b-3 which defines a relationship between the color element levels (levels 8 to 0) and the luminance levels of sub-pixels.

FIG. 29A illustrates an exemplary neighborhood processing table which can be used as a neighborhood processing table 32e.

FIG. 29B illustrates a neighborhood processing table 32e-2 for displaying a character so as to appear thicker.

FIG. 30 shows a result of how the control information units for the neighboring sub-pixels may be set, with respect to the skeletal portion of stroke #1 of the alphabetical letter "A", based on a neighborhood processing table 32e-1.

FIG. 31 shows a result of how the control information units for the neighboring sub-pixels may be set, with respect to the skeletal portion of stroke #2 of the alphabetical letter "A", based on the neighborhood processing table 32e-1.

FIG. 32 shows a result of how the control information units for the neighboring sub-pixels may be set, with respect to the skeletal portion of stroke #3 of the alphabetical letter "A", based on the neighborhood processing table 32e-1.

FIG. 33 shows a multi-value drawing pattern which has been generated from the skeleton data of the alphabetical letter "A".

FIG. 34 shows an array of sub-pixels representing skeletal portions of the alphabetical letter

DESCRIPTION OF THE PREFERRED EMBODIMENTS

First of all, the principles of image displaying using a 3D display device will be described. The below-described image displaying principles shall apply to all of the examples of the present invention which are illustrated below.

Figure 1A:
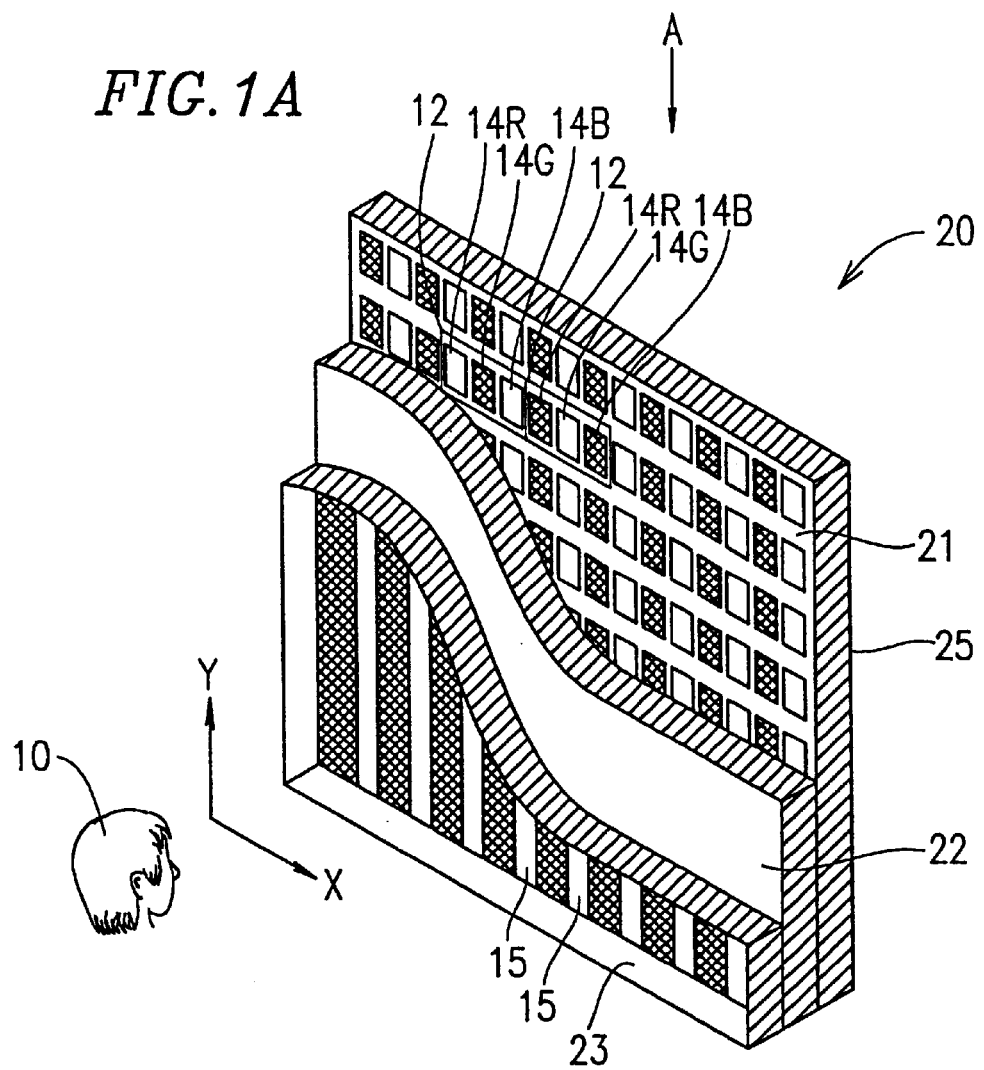
FIG. 1A is a perspective view illustrating the structure of a 3D display device having a stripe-type liquid crystal display apparatus and a parallax optics device.

FIG. 1A is a perspective view illustrating the structure of a 3D display device 20. The 3D display device 20 includes a stripe-type liquid crystal display apparatus 25 and a parallax optics device 23.

The stripe-type liquid crystal display apparatus 25 has a display surface 21, which includes a plurality of pixels 12 that are arrayed along a X direction and a Y direction. Each of the plurality of pixels 12 includes a plurality of sub-pixels arrayed along the X direction. In the exemplary structure shown in FIG. 1A, each pixel 12 includes three sub-pixels, i.e., 14R, 14G, and 14B.

Each sub-pixel 14R is previously assigned to a color element, R, so as to exhibit the color red (R). Each sub-pixel 14G is previously assigned to a color element, G, so as to exhibit the color green (G). Each sub-pixel 14B is previously assigned to a color element, B, so as to exhibit the color blue (B).

The display surface 21 and the parallax optics device 23 are maintained at a constant distance from each other. In order to maintain a constant distance between the display surface 21 and the parallax optics device 23, a transmissive element 22, for example, may be interposed between the display surface 21 and the parallax optics device 23.

The parallax optics device 23 includes a plurality of slits 15 which are arrayed along the X direction. The parallax optics device 23 may be, for example, a panel having a lattice configuration. The slits 15 ensure that each sub-pixel on the display surface 21 is viewable to only the right eye or the left eye of a viewer 10 who is situated at a predetermined position with respect to the 3D display device 20.

Next, the principles by which the slits 15 of the parallax optics device 23 can ensure that each sub-pixel on the display surface 21 is viewable to only the right eye or the left eye of the viewer 10 will be described.

FIG. 1B is a plan view illustrating the 3D display device 20 of FIG. 1A as viewed in the direction of arrow A shown in FIG. 1A.

A slit 15-1 shown in FIG. 1B is an exemplary slit among the plurality of slits 15 of the parallax optics device 23.

A pixel 12-1 shown in FIG. 1B is an exemplary pixel among the plurality of pixels on the display surface 21. The pixel 12-1 includes three sub-pixels 14R-1, 14G-1, and 14B-1, which are arrayed along the X direction. The three sub-pixels 14R-1, 14G-1, and 14B-1 are previously assigned to the color element R, color element G, and color element B, respectively. Similarly, a pixel 12-2 includes three sub-pixels 14R-2, 14G-2, and 14B-2, which are arrayed along the X direction. The three sub-pixels 14R-2, 14G-2, and 14B-2 are previously assigned to the color element R, color element G, and color element B, respectively.

The sub-pixel 14G-1, which is viewable to the right eye 10R of the viewer via the slit 15-1, is not viewable to the left eye 10L of the viewer. Similarly, the sub-pixel 14G-2, which is viewable to the left eye 10L of the viewer via the slit 15-1, is not viewable to the right eye 10R of the viewer.

Similarly, each sub-pixel on the display surface 21 is viewable to only the right eye or the left eye of the viewer. In the exemplary case shown in FIG. 1B, the sub-pixels 14B-2, 14R-2, and 14G-1 are viewable to only the right eye 10R of the viewer, whereas the sub-pixels 14G-2, 14B-1, and 14R-1 are viewable to only the left eye 10L of the viewer. Thus, the sub-pixels which are viewable to only the right eye and the sub-pixels which are viewable to only the left eye are alternately located on the display surface 21 along the X-axis direction.

Among the sub-pixels 14R, 14G, and 14B on the display surface 21 shown in FIG. 1A, any sub-pixels which are shown hatched in FIG. 1A are viewable to only the left eye of the viewer 10, whereas any sub-pixels which are shown unhatched (i.e., white) in FIG. 1A are viewable to only the right eye of the viewer 10. Thus, an image which is composed of a number of sub-pixels which are shown hatched in FIG. 1A is presented to the left eye of the viewer 10, while an image which is composed of a number of sub-pixels which are shown unhatched (i.e., white) in FIG. 1A is presented to the right eye of the viewer 10.

Based on the above principles, in accordance with the 3D display device 20 shown in FIG. 1A, it is possible to present distinct images to the right eye and the left eye of a viewer, thereby allowing the viewer to perceive a depth dimension. In other words, a 3D image is displayed by the 3D display device.

In some cases, it may be necessary to display a 2D image on the 3D display device, e.g. in the case where editing of a text is required.

However, it has been confirmed, through experimentation by the inventors, that merely displaying 2D image data on the display surface 21 based on a pixel-by-pixel control results in the generation of color noises (e.g., color stripes). As used herein, performing a "pixel-by-pixel control" means associating the dots composing 2D image data with the pixels on a display surface, and based on the information carried by such dots, controlling the luminance levels of the sub-pixels included in the respective pixels. For example, in the case of 2D image data which represents a black/white binary image, each dot composing the 2D image data has a value (information) representing ON or OFF. In this case, according to a pixel-by-pixel control, the luminance levels of the sub-pixels of any pixels which are associated with dots having a value indicating "OFF" are controlled so that all such pixels will exhibit one color (e.g., black), whereas the luminance levels of the sub-pixels of any pixels which are associated with dots having a value indicating "ON" are controlled so that all such pixels will exhibit another color (e.g., white).

Hereinafter, the principles by which color noises occur in the case where 2D image data is displayed on the display surface 21 of the 3D display device 20 through pixel-by-pixel control will be described.

Figure 2:
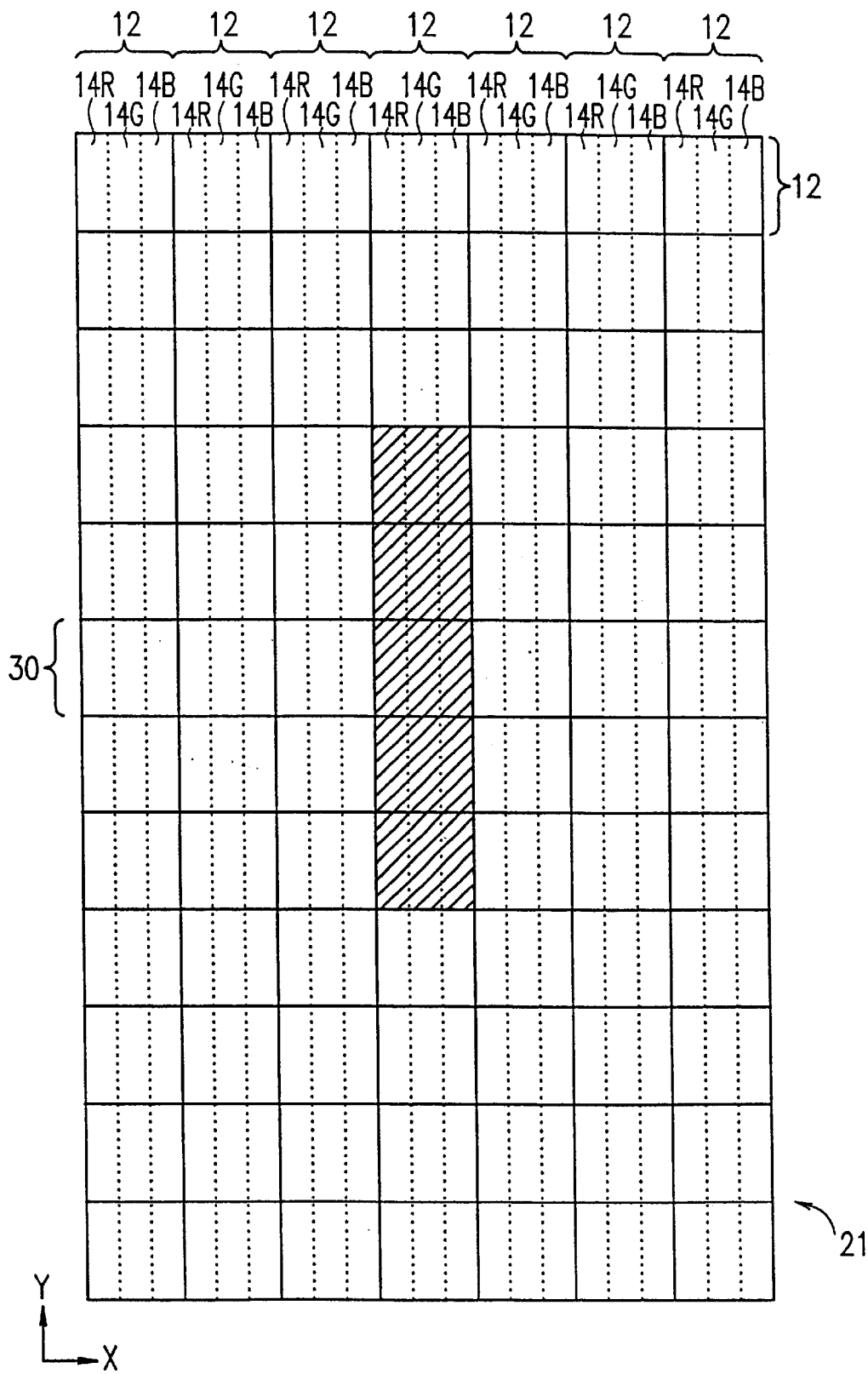
FIG. 2 illustrates the case in which a vertical line having a width of 1 dot and a length of 5 dots is rendered on the display surface 21 shown in FIG. 1A.

FIG. 2 illustrates the case in which 2D image data representing a vertical line having a width of 1 dot and a length of 5 dots is rendered on the display surface 21 shown in FIG. 1A. Such a vertical line may be, for example, a part of a character. Any pixels shown hatched in FIG. 2 represent pixels which are associated with those dots of the 2D image data which have an "OFF" value; such pixels may be displayed in black, for example, on the display surface 21. Any pixels shown unhatched in FIG. 2 represent pixels which are associated with those dots of the 2D image data which have an "ON" value; such pixels may be displayed in white, for example, on the display surface 21.

In the case where each of the color elements to which the sub-pixels 14R, 14G, and 14B are assigned is controlled in 256 gray-scale levels, the luminance of each of the sub-pixels 14R, 14G, and 14B can be represented by a value from 0 to 255. By setting each of the sub-pixels 14R, 14G, and 14B at a value in the range of 0 to 255 (which represents a luminance level), it is possible to display one of about 16,700,000 (=256×256×256) colors.

For example, the black color may be displayed by setting the luminance levels of the respective color elements (R,G, B) of all of the sub-pixels included in a given pixel on the display surface 21 at (0,0,0). Similarly, the white color may be displayed by setting the luminance levels of the respective color elements (R,G,B) of all of the sub-pixels included in a given pixel on the display surface 21 at (255,255,255).

Figure 3:
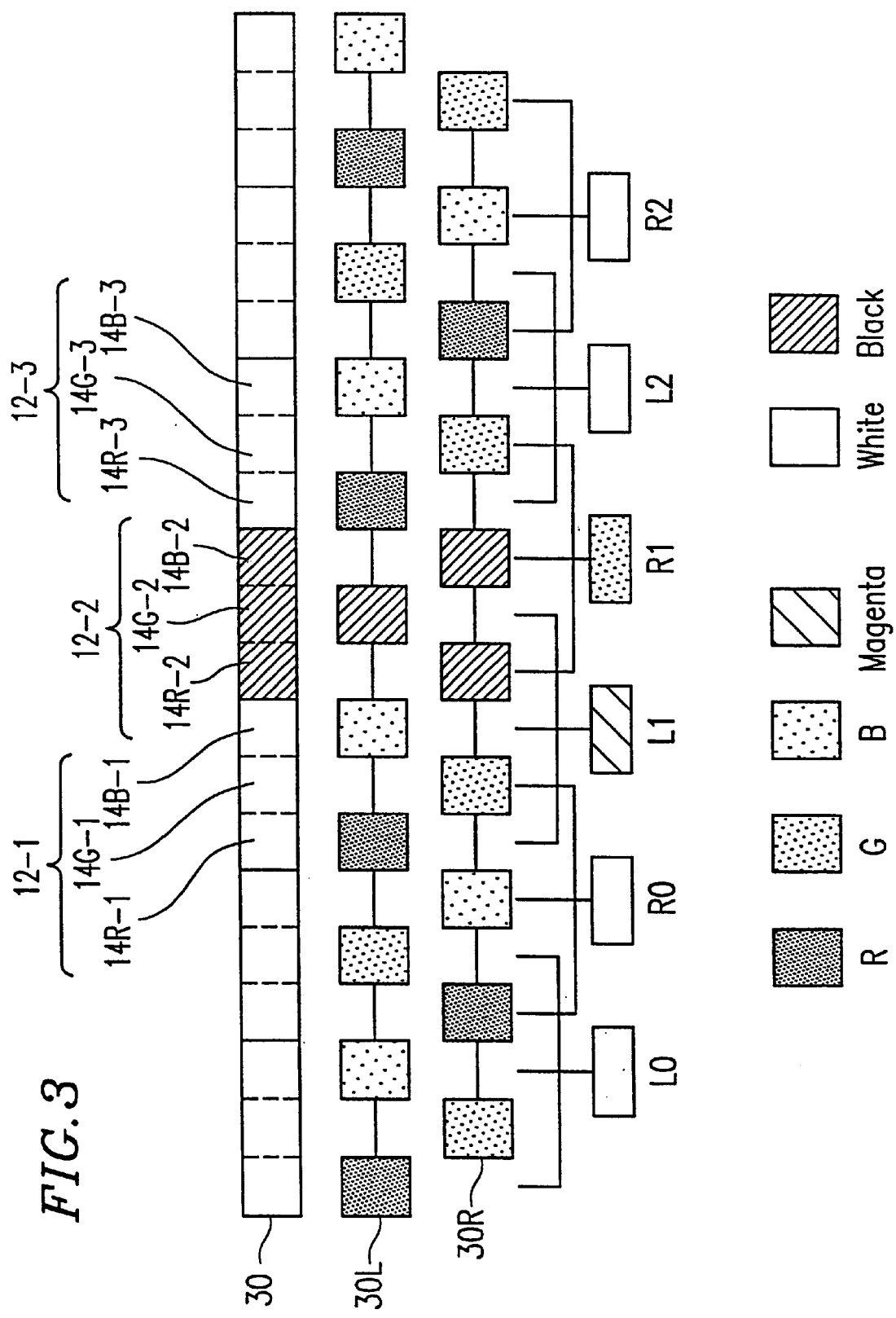
FIG. 3 is a partial view showing a line 30, which is an array of sub-pixels along the X direction taken off the display surface 21 shown in FIG. 2.

FIG. 3 is a partial view showing a line 30, which is an array of sub-pixels along the X direction taken off the display surface 21 shown in FIG. 2. Pixels 12-1, 12-2, and 12-3 respectively represent pixels which are contained in the line 30.

The luminance levels of the respective color elements (R,G,B) of all of the sub-pixels included in the pixel 12-1 are set at (255,255,255). Similarly, the luminance levels of the respective color elements (R,G,B) of all of the sub-pixels included in the pixel 12-2 are set at (0,0,0). The luminance levels of the respective color elements (R,G,B) of all of the sub-pixels included in the pixel 12-3 are set at (255,255, 255).

The line 30 is formed of an alternating arrangement of sub-pixels dedicated to the left eye and sub-pixels dedicated to the right eye. As used herein, "dedicated to the left eye" means being viewable to only the left eye of a viewer, whereas "dedicated to the right eye" means being viewable to only the right eye of a viewer.

The line 30 can be disintegrated into a line 30L, which is an array of sub-pixels dedicated to the left eye, and a line 30R, which is an array of sub-pixels dedicated to the right eye.

The sub-pixels 14R-1, 14G-1 and 14B-1 which are included in the pixel 12-1 are viewable to only the left eye, only the right eye, and only the left eye, respectively. The sub-pixels 14R-2, 14G-2, and 14B-2 which are included in the pixel 12-2 are viewable to only the right eye, only the left eye, and only the right eye, respectively. Similarly, the sub-pixels 14R-3, 14G-3, and 14B-3 which are included in the pixel 12-3 are viewable to only the left eye, only the right eye, and only the left eye, respectively.

Thus, it can be seen that the line 30L which is dedicated to the left eye is presented to the left eye of the viewer, whereas the line 30R which is dedicated to the right eye is presented to the right eye of the viewer. At any given moment, each sub-pixels included in the lines 30L and 30R may be exhibiting a color of R(red), G(green), or B(blue), or may not be exhibiting any color (i.e., black).

The viewer cannot separately perceive the sub-pixels 14R-1, 14B-1, and 14G-2 which are included in the line 30L. Rather, the viewer will perceive each set of three sub-pixels as one pixel L1 which is dedicated to the left eye. Similarly, the viewer will perceive the sub-pixels 14R-2, 14B-2, and 14G-3 which are included in the line 30R as one pixel R1 dedicated to the right eye. The pixel L1 dedicated to the left eye and the pixel R1 dedicated to the right eye together compose a stereo-pixel.

The sub-pixels included in each pixel dedicated to the left eye are assigned to the color elements of R, B, and G, respectively, as seen from the left-hand side of FIG. 3. Similarly, the sub-pixels included in each pixel which is dedicated to the right eye are assigned to the color elements of R, B, and G, respectively, as seen from the left-hand side of FIG. 3.

In the exemplary case illustrated in FIG. 3, the luminance levels (R,B,G) of the color elements corresponding to the sub-pixels which are included in the pixel L1 dedicated to the left eye are set to be (255,255,0). As a result, the pixel L1 dedicated to the left eye is perceived by the left eye of the viewer as magenta. Magenta is a color which results when red and blue are mixed through additive color mixing.

Each of the pixels L0 and L2 dedicated to the left eye is perceived by the left eye of the viewer as white.

Similarly, in the exemplary case illustrated in FIG. 3, the luminance levels (R,B,G) of the color elements corresponding to the sub-pixels which are included in the pixel R1 dedicated to the right eye are set to be (0,0,255). As a result, the pixel R1 dedicated to the right eye is perceived by the right eye of the viewer as green.

Each of the pixels R0 and R2 dedicated to the right eye is perceived by the right eye of the viewer as white.

As described above, when a vertical line (2D image data) which is intended to be perceived as black is displayed on the display surface of a 3D display device through a simple pixel-by-pixel control, color noises (e.g., color stripes) will be observed by a viewer who views the image through a parallax optics device.

In order to solve the above problems associated with the conventional technique, the image display apparatus according to the present invention obtains a drawing pattern which corresponds to 2D image data, and displays the drawing pattern on a 3D display device. This drawing pattern is constructed in such a manner that when the drawing pattern is displayed on the 3D display device, the drawing pattern will exhibit a pseudo color which is identical to a color which would be exhibited when the 2D image data is displayed by a 2D display device. As a result, color noises are prevented from occurring.

Hereinafter, examples of the present invention will be described with reference to the figures.

EXAMPLE 1

Figure 4:
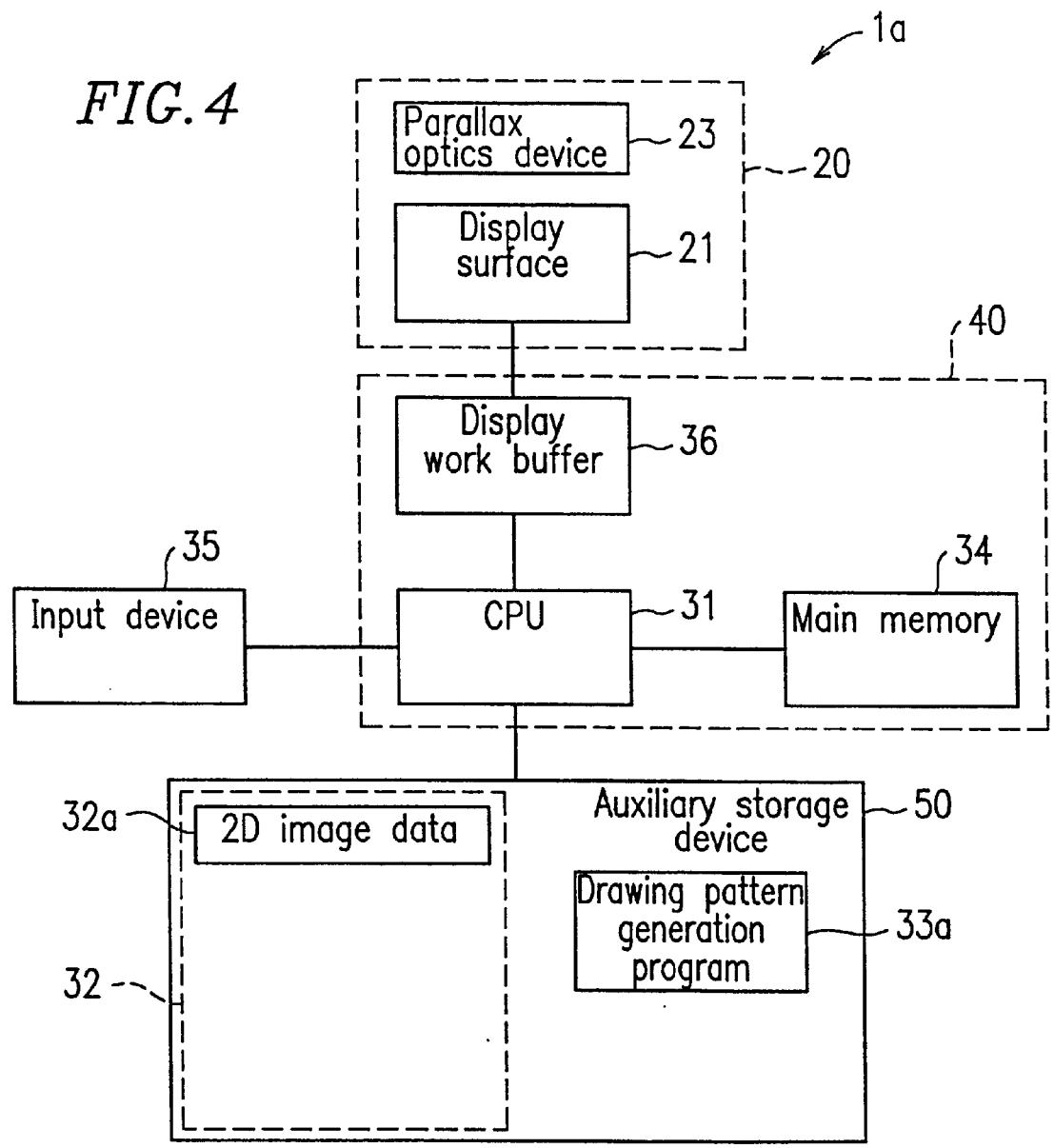
FIG. 4 is a block diagram illustrating the structure of an image display apparatus 1a according to Example 1 of the present invention.

FIG. 4 illustrates the structure of an image display apparatus 1a according to Example 1 of the present invention. The image display apparatus 1a may be, for example, a personal computer. As a personal computer, any type of computer, e.g., desk-top type or lap-top type, may be used. Alternatively, the image display apparatus 1a may be a word processor.

The image display apparatus 1a includes a 3D display device 20 which is capable of displaying color images and a control section 40 for individually controlling a plurality of sub-pixels on a display surface 21 of the 3D display device 20. The control section 40 is coupled to the 3D display device 20, an input device 35, and an auxiliary storage device 50.

The 3D display device 20 includes the display surface 21 as well as a parallax optics device 23. The display surface 21 may be, for example, a stripe-type liquid crystal display device. The parallax optics device 23 may be, for example, a parallax barrier. The parallax optics device 23 may be detachable from the 3D display device 20. When the parallax optics device 23 is detached from the 3D display device 20, a viewer can directly observe the display surface 21, so that the 3D display device 20 can be used as an ordinary 2D display device. The operation principles of the 3D display device 20, which have already been described with reference to FIGS. 1A and 1B, are omitted from descriptions hereinafter. The principles by which an image can be displayed on the display surface 21, which has already been described with reference to FIG. 2, are omitted from descriptions hereinafter.

The auxiliary storage device 50 stores a drawing pattern generation program 33a and data 32 which is necessary for executing the drawing pattern generation program 33a. The data 32 includes 2D image data 32a. The 2D image data 32a may be, for example, data representing characters or line drawings. As the auxiliary storage device 50, any type of storage device that is capable of storing the drawing pattern generation program 33a and the data 32 can be used. As a recording medium used in the auxiliary storage device 50 for storing the drawing pattern generation program 33a and the data 32, any type of recording medium can be used. For example, a recording medium such as a hard disk, a CD-ROM, an MO, a floppy disk, an MD, a DVD, an IC card, or an optical card may be suitably used.

It is not imperative that the drawing pattern generation program 33a and the data 32 be stored in a recording medium within the auxiliary storage device 50. For example, the drawing pattern generation program 33a and the data 32 may be stored in a ROM (not shown). Such a ROM may be, for example, a mask ROM, an EPROM, an EEPROM, or a flash ROM. In the case where such a ROM is used, it is possible to easily realize a variety of processes by simply exchanging the ROM.

Furthermore, the recording medium for storing the drawing pattern generation program 33a and the data 32 may be a medium for carrying programs and/or data in a flexible manner, e.g., communication media which are used for delivering programs and/or data in a communication network, instead of a medium which carries programs and/or data in a fixed manner, e.g., a storage device such as a disk or a card, or a semiconductor memory. In the case where the image display apparatus 1a includes a means for connecting on-line to a communication network, e.g., the Internet, the drawing pattern generation program 33a and the data 32 may be downloaded from the communication network. In this case, a loader program which is necessary for the downloading may be previously stored in a ROM (not shown), or may be installed to the control section 40 from the auxiliary storage device 50.

The input device 35 is-used for designating 2D image data 32a to be displayed on the 3D display device 20. The 2D image data 32a may be, for example, data representing characters or line drawings. In the case where the 2D image data 32a represents a character, the input device 35 is used for inputting character information, e.g., a character code for identifying the character and a character size indicating the size of the character, to the control section 40. As the input device 35 to be used for such purposes, an input device such as a keyboard may be suitably used. Based on the input character information, the control section 40 retrieves a character to be displayed on the 3D display device 20 from within the 2D image data 32a.

Alternatively, an input device such as a scanner or a pen input device may be used as the input device 35. In this case, any data representing a 2D image can itself be input to the image display apparatus 1a. The input data representing a 2D image is stored in the auxiliary storage device 50 as 2D image data 32a.

The control section 40 includes a CPU 31 and a main memory 34.

The CPU 31 controls and monitors the entire image display apparatus 1a, and executes the drawing pattern generation program 33a which is stored in the auxiliary storage device 50.

The main memory 34 temporarily stores the data which has been input via the input device 35, the data to be displayed on the display surface 21, and the data which is necessary for executing the drawing pattern generation program 33a. The main memory 34 is accessed by the CPU 31.

The CPU 31 executes the drawing pattern generation program 33a based on various data stored in the main memory 34 to generate a drawing pattern. The drawing pattern serves as control information for the sub-pixels. The generated drawing pattern is temporarily stored in a display work buffer 36, and thereafter output to the 3D display device 20. The timing with which the drawing pattern is output to the 3D display device 20 is controlled by the CPU 31.

Hereinafter, the operation principles of the image display apparatus 1a will be described. The following description is directed to the case where a black/white binary 2D image is displayed. Although it is assumed herein that the color elements for each pixel are controlled in 256 gray-scale levels, the present invention is not limited thereto.

When a pixel appears white, the luminance levels (R,G,B) of the color elements corresponding to the sub-pixels included in that pixel are (255,255,255); in such a state, the sub-pixels are said to be "ON". Similarly, when a pixel appears black, the luminance levels (R,G,B) are (0,0,0); in such a state, the sub-pixels said to be "OFF".

In the following description, any reference to a "left(-hand)" or "right(-hand)" side of the display surface 21 corresponds to the left eye-side or the right eye-side, respectively, of the viewer.

The image display apparatus 1a generates a drawing pattern based on the 2D image data 32a, and displays the drawing pattern on the display surface 21 of the 3D display device 20, rather than displaying the 2D image data 32a on the display surface 21 of the 3D display device 20 through pixel-by-pixel control.

Figure 5:
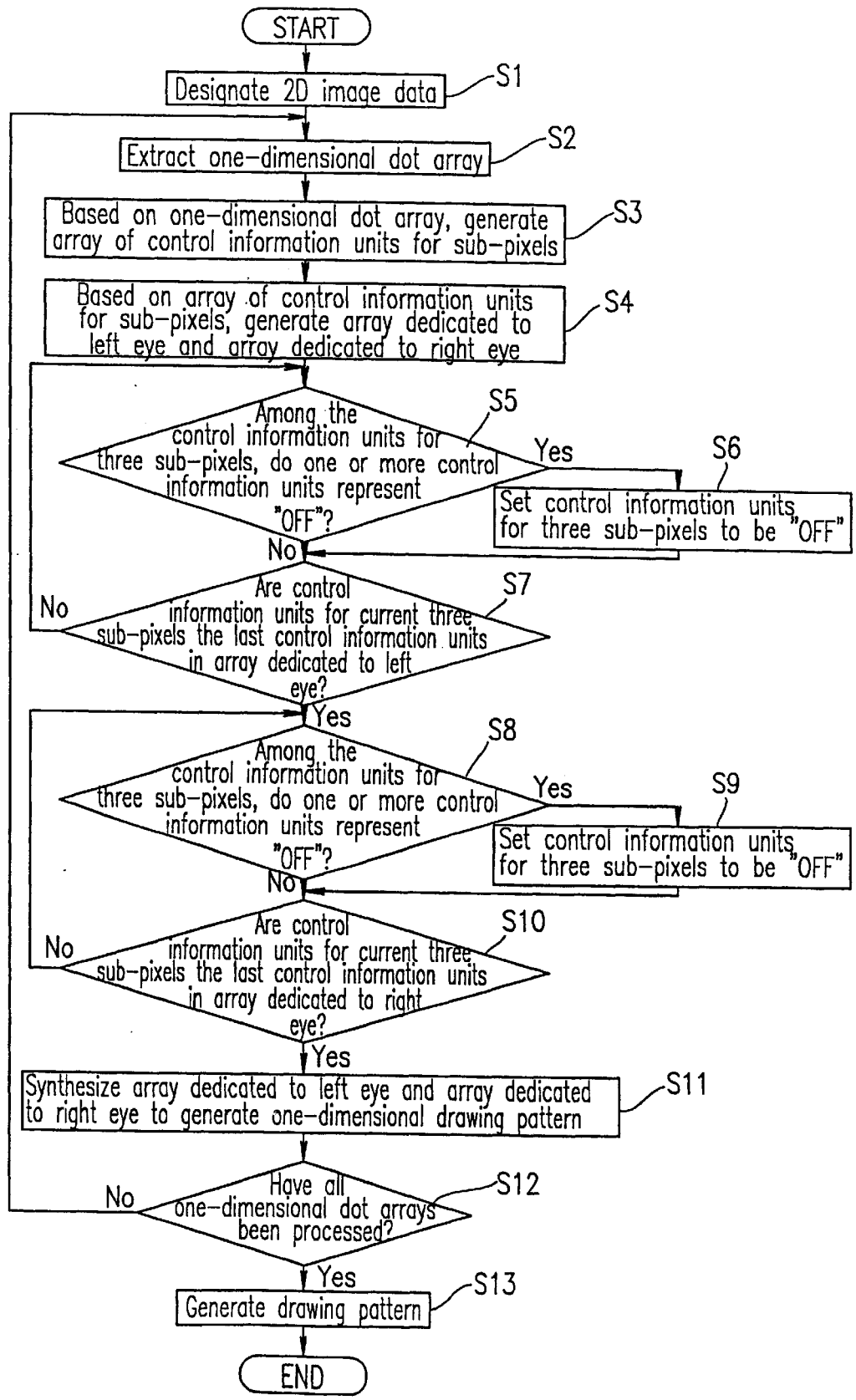
FIG. 5 illustrates a procedure followed by the drawing pattern generation program 33a to generate a drawing pattern based on 2D image data.

FIG. 5 illustrates a procedure followed by the drawing pattern generation program 33a to generate a drawing pattern based on 2D image data. The drawing pattern generation program 33a is executed by the CPU 31. Hereinafter, the procedure followed by the drawing pattern generation program 33a will be described step by step.

Step S1: The 2D image data 32a is designated. For example, in the case where the 2D image data 32a represents a character, a character code and a character size are input via the input device 35, whereby the 2D image data 32a (font data) stored in the auxiliary storage device 50 is designated.

Herein, it is assumed that the 2D image data 32a includes m×n dots, where "m" represent the number of dots along the lateral direction of the 2D image data 32a, and "in" represents the number of dots along the vertical direction of the 2D image data 32a. Each of "n" and "m" may be any integer equal to or greater than 1. Each dot included in the 2D image data 32a has a value representing "ON" or a value representing "OFF". For example, if the value of a given dot is "0", the dot is "ON"; if the value of a given dot is "1", the dot is "OFF". The "ON" and "OFF" of the respectively dots in the 2D image data 32a determine the shape of the 2D image represented by the 2D image data 32a.

Step S2: A one-dimensional dot array is extracted from the 2D image data 32a. As used herein, a "one-dimensional dot array" means an array of m dots which composes any one row of the 2D image data 32a.

Step S3: Based on the one-dimensional dot array, an array of control information units for the sub-pixels is generated. The control information unit for a given sub-pixel has a value representing "ON" or a value representing "OFF". For example, if the value of the control information unit for a sub-pixel is "0", the control information unit for the sub-pixel represents "ON"; if the value of the control information unit for a sub-pixel is "1", the control information unit for the sub-pixel represents "OFF". Based on each "ON" dot, control information units for three sub-pixels representing "ON" are generated. Based on each "OFF" dot, control information units for three sub-pixels representing "OFF" are generated. This is because each of the dots which are included in the one-dimensional dot array corresponds to a pixel on the display surface 21, and each pixel includes three sub-pixels. Thus, an array of control information units for the sub-pixels is generated which contains control information units for 3 m sub-pixels.

Step S4: Based on the array of control information units for the sub-pixels, an array of control information units for the sub-pixels dedicated to the left eye (an "array dedicated to the left eye") and an array of control information units for the sub-pixels dedicated to the right eye (an "array dedicated to the right eye") are generated. These arrays can be obtained by assigning the control information unit for each sub-pixel, which is contained in the array of control information units for the sub-pixels, to either the array dedicated to the left eye or the array dedicated to the right eye. Such assignment will be described later with reference to FIG. 6.

As used herein, an "array dedicated to the left eye" is defined as an array of control information units for the sub-pixels which are viewable to only the left eye. An "array dedicated to the right eye" is defined as an array of control information units for the sub-pixels which are viewable to only the right eye.

The control information units for every three sub-pixels are grouped together, beginning from an end of the array dedicated to the left eye. Such grouping is based on the control information units for the three sub-pixels which are included in each pixel dedicated to the left eye on the display surface 21. A set of control information units for every three sub-pixels which are thus grouped-together is referred to as a "control information set".

The same grouping is also done for the array dedicated to the right eye.

Step S5: It is determined whether or not one or more control information units for sub-pixels among the control information units for the three sub-pixels included in one control information set represents "OFF".

If the determination made in Step S5 is "Yes", then the process proceeds to Step S6. If the determination made in Step S5 is "No", then the process proceeds to Step S7.

Step S6: Each of the control information units for the three sub-pixels included in one control information set is set to be "OFF".

Step S7: It is determined whether or not the processes at Step S5 and S6 are completed for all of the control information sets included in the array dedicated to the left eye.

If the determination made in Step S7 is "Yes", then the process proceeds to Step S8. If the determination made in Step S7 is "No", then the process goes back to Step S5.

Step S8 to S10: Processes similar to the processes from Step S5 to S77 are performed for the array dedicated to the right eye which is generated at Step S4.

Step S11: By synthesizing the array dedicated to the left eye and the array dedicated to the right eye, a one-dimensional drawing pattern is generated. The one-dimensional drawing pattern is a one-dimensional array containing the control information units for 3 m sub-pixels. The one-dimensional drawing pattern can be obtained by interleaving the control information units for sub-pixels contained in the array dedicated to the left eye and the control information units for sub-pixels contained in the array dedicated to the right eye.

Step S12: It is determined whether or not the processes from Step S2 to S11 have been completed for all of the one-dimensional dot arrays included in the 2D image data 32a.

If the determination made in Step S12 is "Yes", then the process proceeds to Step S13. If the determination made in Step S12 is "No", then the process goes back to Step S2.

Step S13: By synthesizing all of the one-dimensional drawing patterns which have been generated at Step S12, a drawing pattern is generated. The drawing pattern is a two-dimensional array which includes control information units for 3 m×n sub-pixels.

Thus, a drawing pattern corresponding to the 2D image data is generated. The values of the control information units for the sub-pixels included in the drawing pattern are converted to luminance levels for the sub-pixels. For example, if a control information unit for a sub-pixel represents "OFF", then the control information unit for that sub-pixel is converted to a sub-pixel luminance level "0"; if a control information unit for a sub-pixel represents "ON", then the control information unit for that sub-pixel is converted to a sub-pixel luminance level "255".

The sub-pixels on the display surface 21 are controlled according to the luminance levels as determined above. As a result, the drawing pattern is displayed on the display surface 21. The timing with which the drawing pattern is displayed on the display surface 21 is controlled by the CPU 31.

Thus, the image display apparatus 1a according to the present invention controls the luminance levels of the sub-pixels on the display surface 21 based on a drawing pattern. The drawing pattern which is generated by the above-described drawing pattern generation program 33a is constructed in such a manner that when the drawing pattern is displayed on the 3D display device 20, the drawing pattern will exhibit a pseudo color which is identical to a color which would be exhibited when the 2D image data 32a is displayed by a 2D display device. As a result, color noises are prevented from occurring.

Figure 6:
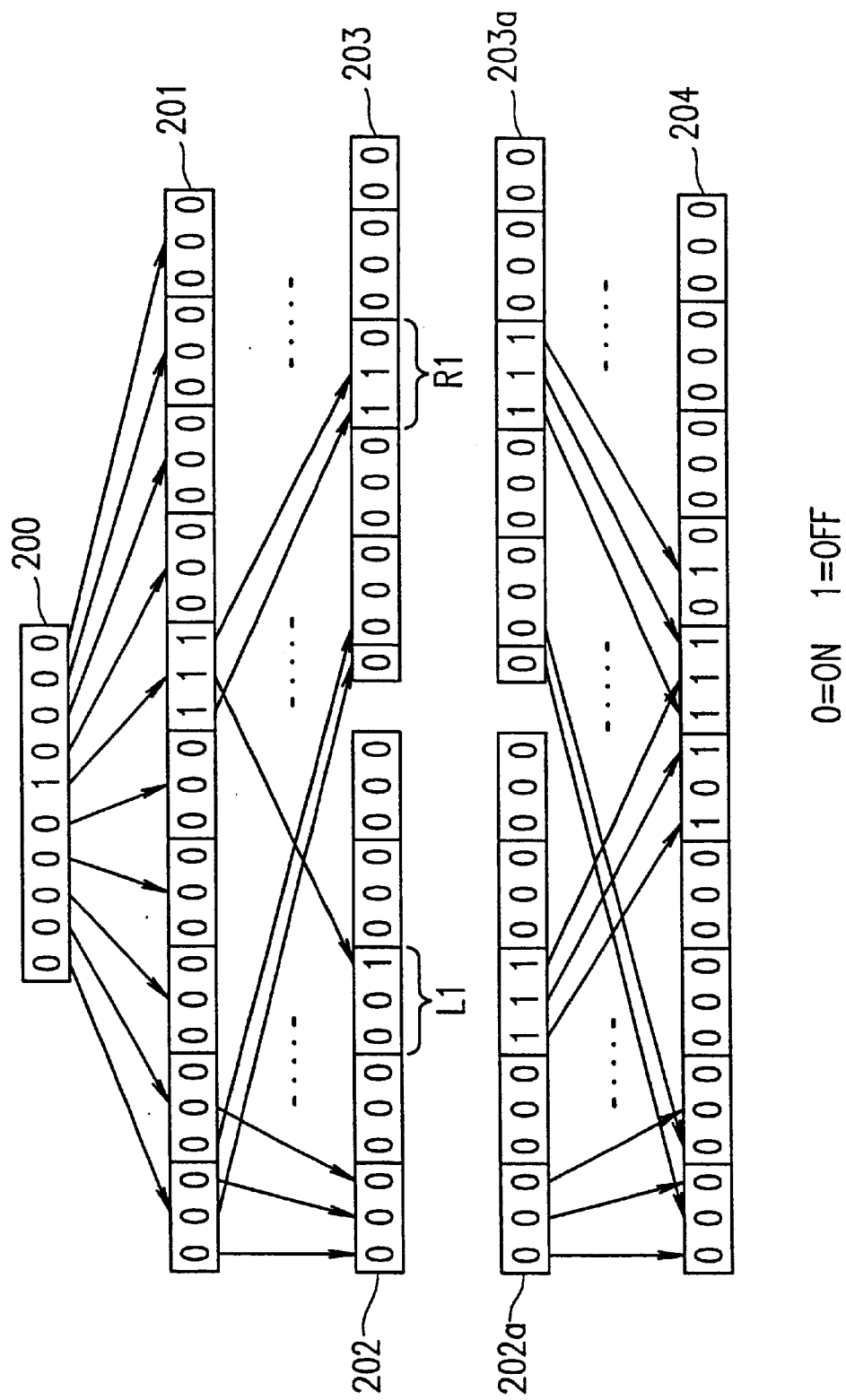
FIG. 6 illustrates how a drawing pattern can be generated based on 2D image data.

FIG. 6 illustrates how a drawing pattern can be generated based on 2D image data.

An array 200 is an exemplary array among the one-dimensional dot arrays which may be included in the 2D image data. In the array 200, "1" represents an "OFF" dot, and "0" represents an "ON" dot.

An array 201 is an array of control information units for sub-pixels, which is generated based on the one-dimensional dot array 200. Based on one "1" within the array 200, three "1"s in the array 201 are generated; based on one "0" within the array 200, three "0"s in the array 201 are generated. In arrays 202, 203, 202a, 203a, and 204, any "1" represents a control information unit for an "OFF" sub-pixel, whereas any "0" represents a control information unit for an "ON" sub-pixel.

The arrays 202 and 203 represent an array dedicated to the left eye and an array dedicated to the right eye, respectively. The array dedicated to the left eye 202 and the array dedicated to the right eye 203 are generated by the process at Step S4 shown in FIG. 5. Since more than one control information unit for "OFF" sub-pixels is included in a control information set L1 in the array 202, all of the control information units for sub-pixels in the control information set L1 are set to be "OFF" by the process of Step 6 shown in FIG. 5. As a result, the array dedicated to the left eye 202 is converted into the array 202a. Similarly, since more than one control information unit for "OFF" sub-pixels is included in a control information set R1 in the array 203, all of the control information units for sub-pixels in the control information set R1 are set to be "OFF". As a result, the array dedicated to the right eye 203 is converted into the array 203a.

By interleaving the array dedicated to the left eye 202a and the array dedicated to the right eye 203a, the one-dimensional drawing pattern 204 is obtained.

By synthesizing all of the one-dimensional drawing patterns 204 which have been generated for all of the one-dimensional dot arrays 200 included in the 2D image data, a final drawing pattern is generated.

Figure 7:
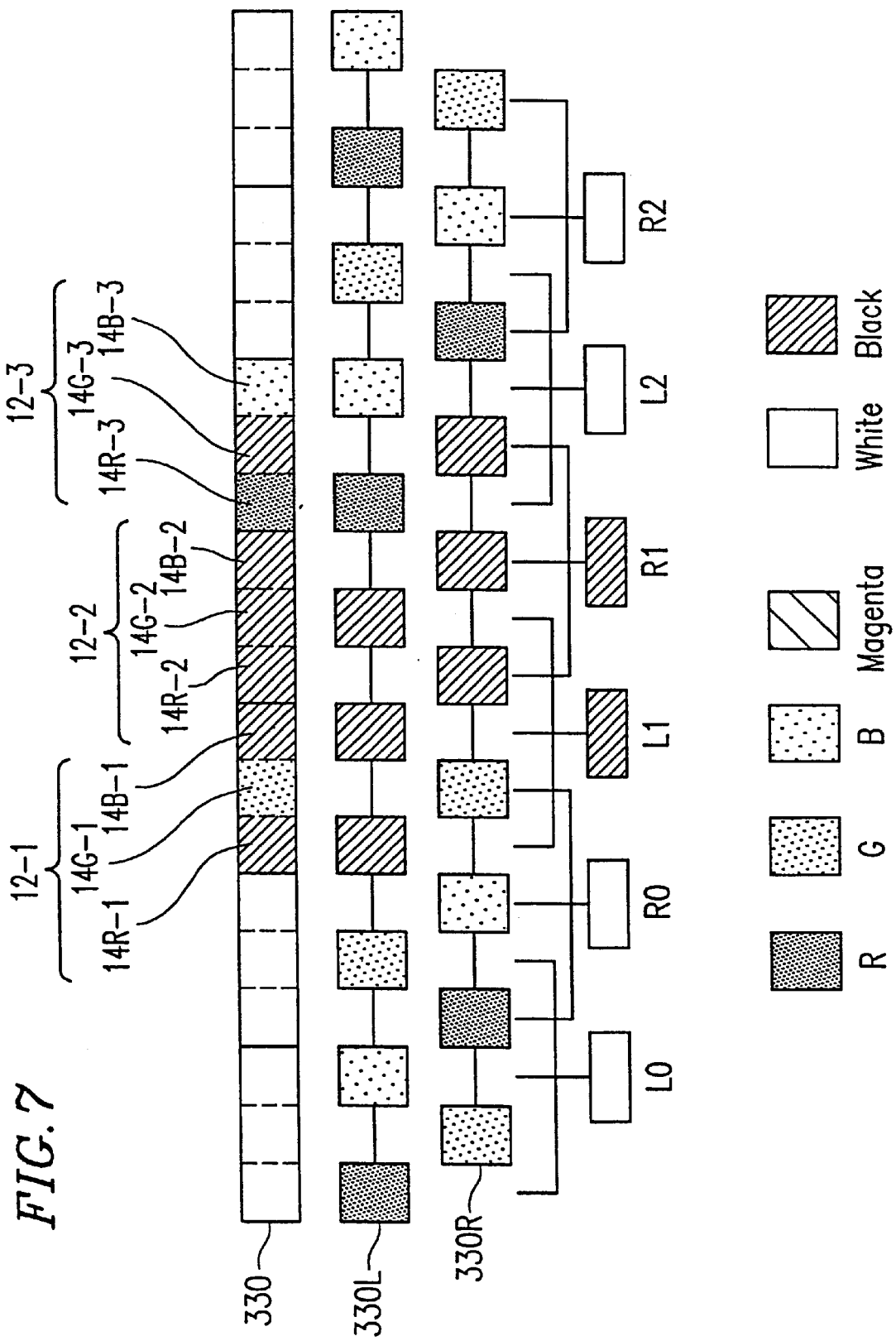
FIG. 7 shows a portion (a line 330) of the display surface 21 on which the one-dimensional drawing pattern 204 shown in FIG. 6 is displayed.

FIG. 7 shows a portion (a line 330) of the display surface 21 on which the one-dimensional drawing pattern 204 shown in FIG. 6 is displayed.

The line 330 can be disintegrated into a line 330L dedicated to the left eye and a line 330R dedicated to the right eye.

Based on the principles similar to those described with reference to FIG. 3, a pixel L1 dedicated to the left eye which is included in the line 330L dedicated to the left eye is perceived as black by the left eye of the viewer.

Pixels L0 and L2 dedicated to the left eye are perceived as white by the left eye of the viewer.

Similarly, a pixel R1 dedicated to the right eye which is included in the line 330R is perceived as black by the right eye of the viewer.

Pixels R0 and R2 dedicated to the right eye are perceived as white by the right eye of the viewer.

In other words, a black "dot" will be perceived by each of the left eye and the right eye of the viewer.

The images which are perceived by the left eye of and the right eye of the viewer are merged within the brain of the viewer, so as to be perceived as one image.

Note that any desired color which would be exhibited when the 2D image data is displayed on a 2D display device can be perceived by the left eye and the right eye of the viewer. For example, the "OFF" dots may exhibit the black color, whereas the "ON" dots may exhibit the white color. The displaying of 2D image data on a 2D display device may occur, for example, through additive color mixing.

The principles according to the present invention for preventing color noises when displaying the one-dimensional drawing pattern 204 on the display surface 21 have been described above. From the above principles, it will be clear that color noises will not be generated when a drawing pattern which is generated by synthesizing a plurality of one-dimensional drawing patterns is displayed on the display surface 21.

Figure 8:
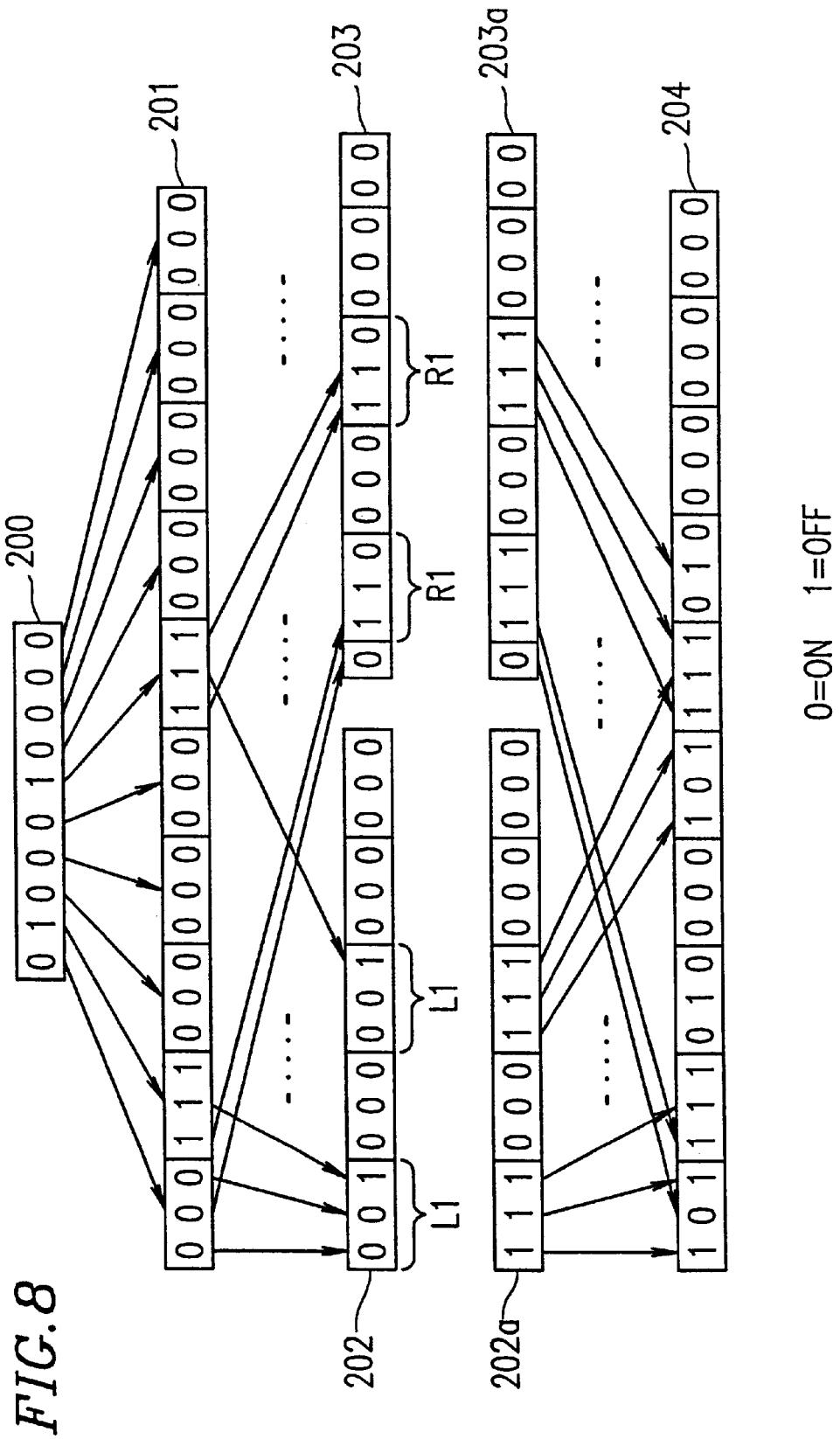
FIG. 8 illustrates how a drawing pattern can be generated based on 2D image data containing two "OFF" dots within a one-dimensional dot array.

FIG. 8 illustrates how a drawing pattern can be generated based on 2D image data containing two "OFF" dots within a one-dimensional dot array.

The procedure for generating a one-dimensional drawing pattern 204 from a one-dimensional dot array 200 is the same as that described with reference to FIG. 6.

Figure 9A:
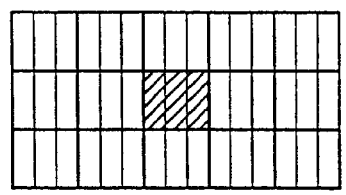
FIG. 9A illustrates a manner in which 2D image data representing a black "dot" having the size of 1 dot may be displayed on the display surface 21 through pixel-by-pixel control.

FIG. 9A illustrates a manner in which 2D image data representing a black "dot" having the size of 1 dot may be displayed on the display surface 21 through pixel-by-pixel control. Such a "dot" may be employed as a most fundamental element of a character, for example. The boxes of the grid shown in FIG. 9A are representative of the sub-pixels on the display surface 21.

Figure 9B:
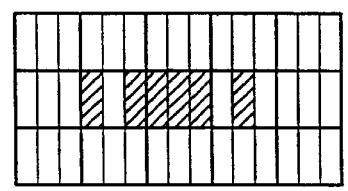
FIG. 9B illustrates a manner in which a drawing pattern which is generated, based on the 2D image data shown in FIG. 9A, by the procedure according to the present invention as illustrated in FIG. 5 may be displayed on the display surface 21.

FIG. 9B illustrates a manner in which a drawing pattern which is generated, based on the 2D image data shown in FIG. 9A, by the procedure according to the present invention as illustrated in FIG. 5 may be displayed on the display surface 21.

Figure 9C:
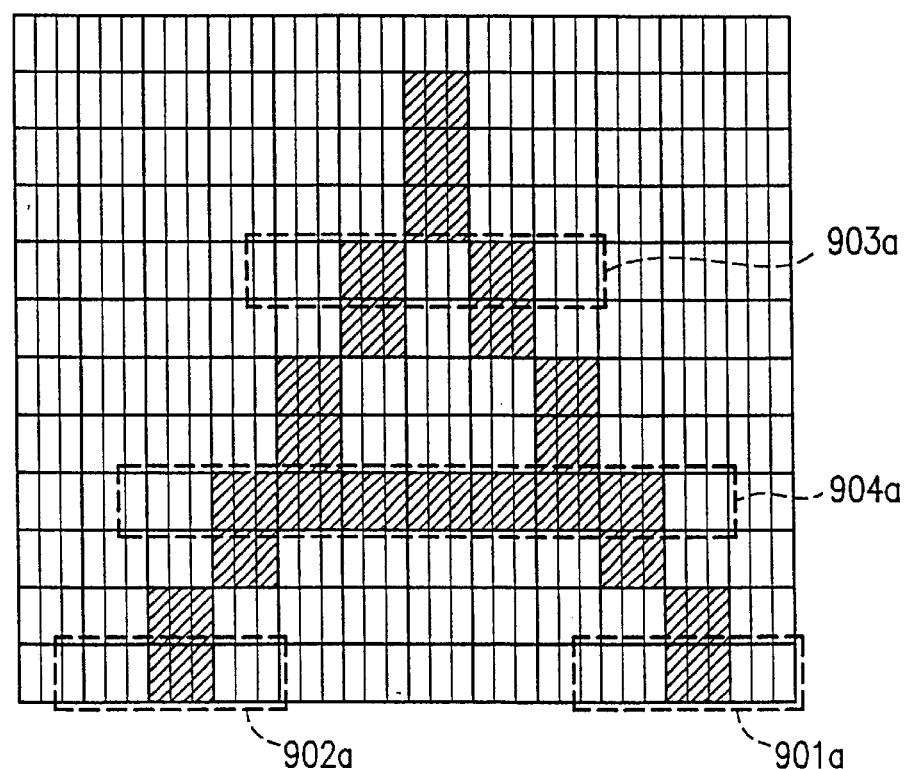
FIG. 9C illustrates a manner in which 2D image data representing the shape of the alphabetical letter "A" may be displayed on the display surface 21 through pixel-by-pixel control.

FIG. 9C illustrates a manner in which 2D image data representing the shape of the alphabetical letter "A" may be displayed on the display surface 21 through pixel-by-pixel control.

Figure 9D:
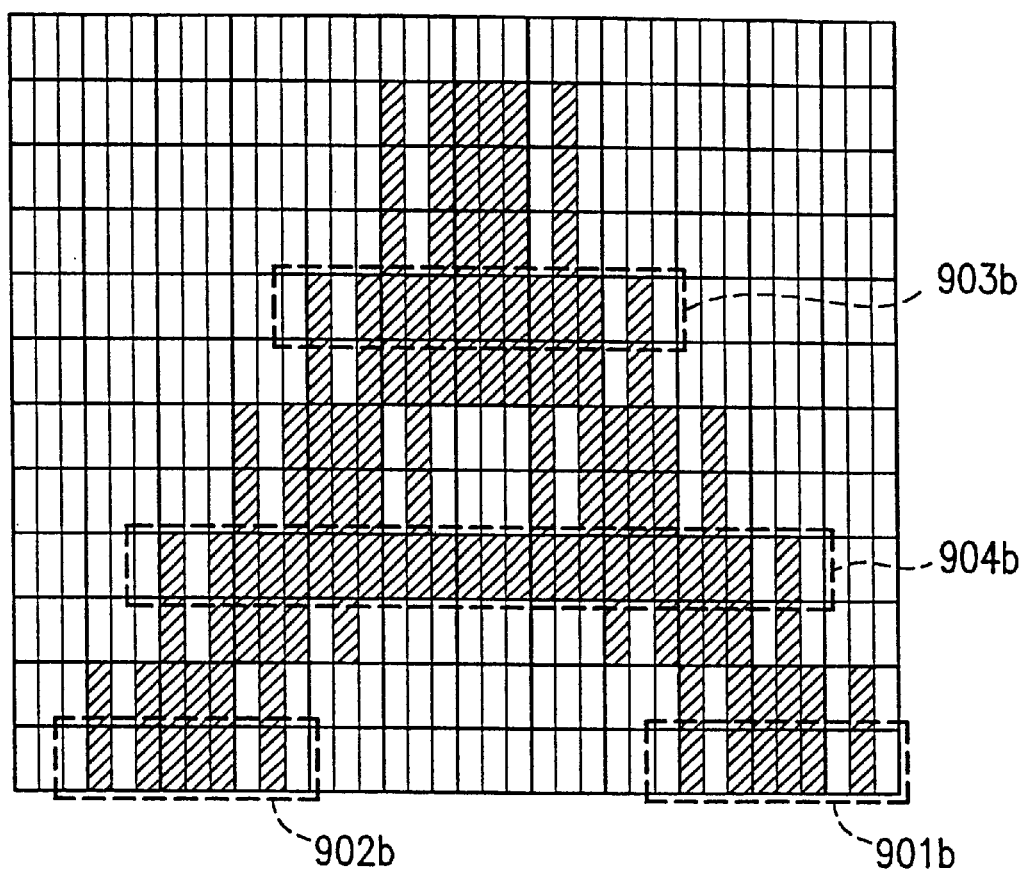
FIG. 9D illustrates a manner in which a drawing pattern which is generated based on the 2D image data shown in FIG. 9C by the procedure according to the present invention as illustrated in FIG. 5 may be displayed on the display surface 21.

FIG. 9D illustrates a manner in which a drawing pattern which is generated based on the 2D image data shown in FIG. 9C by the procedure according to the present invention as illustrated in FIG. 5 may be displayed on the display surface 21.

The sub-pixels which are shown hatched in FIGS. 9B and 9D are sub-pixels to be controlled based on the control information units for "OFF" sub-pixels in the drawing pattern. The sub-pixels which are shown unhatched in FIGS. 9B and 9D are sub-pixels to be controlled based on the control information units for "ON" sub-pixels in the drawing pattern.

A viewer who observes the display surface shown in FIG. 9C via a parallax optics device will perceive color noises. On the other hand, a viewer who observes the display surface shown in FIG. 9D via the parallax optics device 23 (FIG. 4) will be able to recognize the character, i.e., the alphabetical letter "A", without perceiving color noises.

Thus, the image display apparatus according to the present invention can be suitably used for displaying a character on a 3D display device.

When black dots are displayed against a white background on the display surface 21, most conspicuous color noises are likely to occur in portions where a substantial change in the luminance level occurs along the lateral direction, e.g., at the boundaries between black and white. Therefore, substantial color noises may occur when a black character is displayed against a white background. A character, which includes a large number of boundaries between black and white as compared to other types of images, is especially susceptible to color noises in various portions. When a character is accompanied by color noises, the eyes of a viewer experience considerable fatigue.

Thus, the image display apparatus of Example 1 of the present invention is especially effective for displaying a character without color noises. However, the 2D image data according to Example 1 is not limited to characters. For example, any black/white binary image data can be displayed without color noises. As used herein, a "black/white binary image data" means an image in which the dots of the 2D image data represent either white or black.

Furthermore, the image display apparatus 1a according to Example 1 of the present invention is applicable to 2D image data which is gray/black binary image data or white/gray binary image data, as well as 2D image data which is black/white binary image data.

For example, in the case where the 2D image data is gray/black binary image data, the image display apparatus 1a may be arranged so that pseudo gray and pseudo black will be exhibited when displaying a drawing pattern on the display surface 21. Herein, it is assumed that a "gray" color can be displayed by setting the luminance levels (R,G,B) of the color elements corresponding to the sub-pixels included in one pixel at (128,128,128). In order to ensure that gray and black colors can be exhibited when displaying a drawing pattern on the display surface 21, the values of the control information units for sub-pixels in an obtained drawing pattern are converted to luminance level values for sub-pixels in such a manner that any control information unit for an "OFF" sub-pixel is converted to a luminance level "0", and that any control information unit for an "ON" sub-pixel is converted to a luminance level "128".

The same principle also applies to the case where the 2D image data is white/gray binary image data.

The 2D image data according to Example 1 does not need to be defined as a set of dots. For example, the 2D image data may be defined as a set of lines, where each line is defined by coordinates representing a start point and an end point. Methods for representing a line which is defined in this manner as a set of dots are well-known. By using such methods, it is possible to redefine given 2D image data as a set of dots. By applying the procedure shown in FIG. 5 to the redefined set of dots, a drawing pattern can be generated.

The 2D image data may also be defined based on skeleton data as used in Example 3 (described below). By redefining 2D image data which is defined based on skeleton data as a set of dots, it is possible to apply the procedure shown in FIG. 5 to the redefined set of dots.

In the above description, a drawing pattern is generated based on 2D image data according to the procedure shown in FIG. 5. In the alternative, drawing patterns corresponding to 2D image data may be previously stored in a memory (e.g., the auxiliary storage device 50 or a ROM). Especially in the case where the number of possible 2D image data is known (e.g., where the 2D image data represent characters), it is suitable to previously store a number of drawing patterns corresponding to such 2D image data in a memory.

The 3D display device 20 is not limited to be of the above-described type. As the 3D display device 20, any type of 3D display device may be employed.

As the display surface 21 of the 3D display device 20, a stripe-type color liquid crystal display device may be employed, for example. As the color liquid crystal display device, a reflection type or rear-projection type liquid crystal display device may be employed, as well as a transmission liquid crystal display device which is frequently used in personal computers and the like. However, the display surface 21 is not limited to a color liquid crystal display device. The display surface 21 may be a stripe-type CRT, for example. Among color display apparatuses featuring a plurality of pixels arrayed along an X direction and a Y direction (a so-called X-Y matrix display apparatus), any stripe-type color display apparatus in which the sub-pixels are arrayed along a single direction may be suitably employed as the display surface 21.

The number of sub-pixels to be included in one pixel is not limited to 3. Each pixel may include two or more sub-pixels which are arrayed along a predetermined direction. For example, in the case where colors are to be exhibited by using N color elements (N≧2), each pixel may include N sub-pixels.

Furthermore, the lateral order in which sub-pixels are arrayed on the display surface 21 is not limited to the order of (R,G,B) from the left. For example, the sub-pixels may be arrayed in the order of (B,G,R) from the left.

Furthermore, the color elements which are applicable to the present invention are not limited to R(red), G(green), and B(blue). For example, C(cyan), Y(yellow), and M(magenta) may be used as the color elements.

EXAMPLE 2

In Example 1 of the present invention, each control information unit for a sub-pixel in a drawing pattern represents either "ON" or "OFF"; accordingly each sub-pixel is controlled so as to have either a luminance level corresponding to "ON" or a luminance level corresponding to "OFF". In Example 2 of the present invention, the luminance level of each sub-pixel may be set at an intermediate level between a luminance level corresponding to "ON" and a luminance level corresponding to "OFF", so that portions of a given image which constitute oblique lines or curves can be smoothly displayed. As a result, the display quality of images can be substantially improved.

Figure 10:
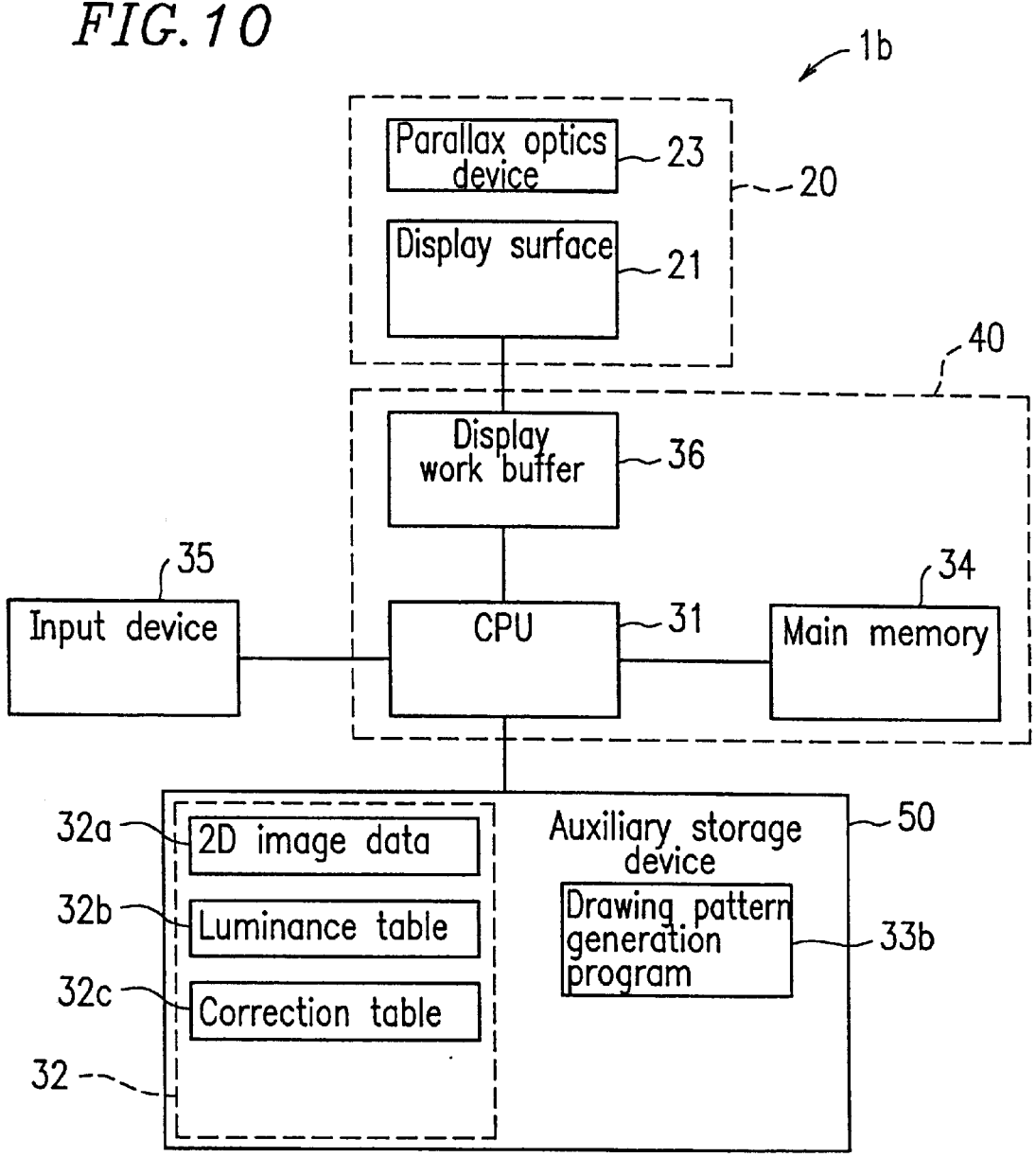
FIG. 10 is a block diagram illustrating the structure of an image display apparatus 1b according to Example 2 of the present invention.

FIG. 10 is a block diagram illustrating the structure of an image display apparatus 1b according to Example 2 of the present invention.

In FIG. 10, the components elements which also appear in FIG. 4 are denoted by the same reference numerals as those used therein, and descriptions thereof are omitted.

An auxiliary storage device 50 stores a drawing pattern generation program 33b and data 32 which is necessary for executing the drawing pattern generation program 33b. The data 32 includes a luminance table 32b and a correction table 32c. As the auxiliary storage device 50, any type of storage device capable of storing the drawing pattern generation program 33b and the data 32 can be used.

FIG. 11 shows the luminance table 32b, which defines a relationship between the color element levels (levels 8 to 0) and the luminance levels of sub-pixels.

In Example 1, as described above, sub-pixels on the display surface 21 are controlled so as to have either a luminance level corresponding to "ON" (e.g., 255) or a luminance level corresponding to "OFF" (e.g., 0) based on the control information units for sub-pixels in the drawing pattern. Hereinafter, a drawing pattern which includes control information units for "ON" or "OFF" sub-pixels will be referred to as a "binary drawing pattern".

According to Example 2 of the present invention, each sub-pixel is controlled at multiple luminance levels, as opposed to two luminance levels. As used herein, "multiple" levels refer to three or more levels. According to the luminance table 32b shown in FIG. 11, nine color element levels for sub-pixels (level 8 to level 0) are assigned across luminance levels from 0 to 255 in a substantially equidistant manner. The control information units for sub-pixels are represented by color element levels.

The color element level "8" corresponds to a control information unit for an "OFF" sub-pixel. The color element level "0" corresponds to a control information unit for an "ON" sub-pixel. The drawing pattern according to Example 2 is defined as a set of control information units for sub-pixels having various color element levels.

Hereinafter, a drawing pattern which includes control information units for sub-pixels, each of which may take one of multiple color element levels, will be referred to as a "multi-value drawing pattern".

According to Example 2, a control section 40 of the image display apparatus 1b (FIG. 10) performs a pattern replacement for a binary drawing pattern as generated according to Example 1, based on a correction table. As a result, a multi-value drawing pattern is generated. The control section 40 controls the color element levels of sub-pixels based on the resultant multi-value drawing pattern.

Hereinafter, the operation principles of the image display apparatus 1b will be described. The following description is directed to the case where the 2D image is black/white binary image data.

The generation of a binary drawing pattern based on 2D image data, where the generation is performed according to the procedure described in Example 1, will be discussed. In the 2D image data, a given array of "OFF" dots may be classified into one of the following three types:

(1) an array which includes, in the 2D image data, "OFF" dots (each having a width of 1 dot) which are at distant positions from (i.e., not contiguous to) one another along the lateral direction, such that when the 2D image data is displayed on a display surface through pixel-by-pixel control, sub-pixels corresponding to these dots do not appear contiguous to one another, and when a binary drawing pattern which is generated based on the 2D image data is displayed on a display surface, not more than four contiguous sub-pixels exist which are to be controlled by control information units for "OFF" sub-pixels;

(2) an array which includes, in the 2D image data, one or more groups of two "OFF" dots which are relatively close to each other along the lateral direction, such that when the 2D image data is displayed on a display surface through pixel-by-pixel control, sub-pixels corresponding to these dots do not appear contiguous to one another, and when a binary drawing pattern which is generated based on the 2D image data is displayed on a display surface, five or more contiguous sub-pixels exist which are to be controlled by control information units for "OFF" sub-pixels; and (3) an array which includes, in the 2D image data, one or more groups of two or more contiguous "OFF" dots along the lateral direction, such that when the 2D image data is displayed on a display surface through pixel-by-pixel control, sub-pixels corresponding to these dots appear contiguous to one another, and when a binary drawing pattern which is generated based on the 2D image data is displayed on a display surface, five or more contiguous sub-pixels exist which are to be controlled by control information units for "OFF" sub-pixels.

Referring back to FIGS. 9C and 9D, the above three examples of arrays will be specifically described. A line 901a shown in FIG. 9C includes three sub-pixels which are shown hatched; these sub-pixels correspond to one "OFF" dot in the 2D image data. Similarly, three sub-pixels in a line 902a which are shown hatched correspond to another "OFF" dot in the 2D image data. The sub-pixels corresponding to the "OFF" dot in the line 901a and the sub-pixels corresponding to the "OFF" dot in the line 902a are at distant positions from (i.e., not contiguous to) one another.

The line 901b shown in FIG. 9D is an array of sub-pixels which are on the same display surface that the line 901a (FIG. 9C) belongs to. The line 901b includes six sub-pixels which are shown hatched. These sub-pixels are controlled by the control information units for the "OFF" sub-pixels. Similarly, the line 902b is an array of sub-pixels which are on the same display surface that the line 902a (FIG. 9C) belongs to. The sub-pixels in the line 901b which are controlled by control information units for "OFF" sub-pixels and the sub-pixels in the line 902b which are controlled by control information units for "OFF" sub-pixels are at distant positions from (i.e., not contiguous to) one another.

Thus, the one dot in the 2D image data which corresponds to the three "OFF" sub-pixels in the line 901a in FIG. 9C and the one dot in the 2D image data which corresponds to the three "OFF" sub-pixels in the line 902a in FIG. 9C are of the relationship of type (1) among the aforementioned three types of "OFF" dot arrays. in a line 903a shown in FIG. 9C, two groups of three contiguous sub-pixels, which are shown hatched, exist. These two groups of sub-pixels correspond to two "OFF" dots in the 2D image data. These two dots do not adjoin each other, i.e., they are not contiguous. A line 903b shown in FIG. 9D is an array of sub-pixels which is in the same position on the display surface as the line 903a (FIG. 9C). The line 903b includes 10 contiguous sub-pixels which are controlled by control information units for "OFF" sub-pixels. Thus, the two dots in the 2D image data which correspond to the two groups of three contiguous "OFF" sub-pixels in the line 903a of FIG. 9C are of the relationship of type (2) among the aforementioned three types of "OFF" dot arrays.

The line 904a shown in FIG. 9C includes twenty-one contiguous sub-pixels which are shown hatched. These twenty-one sub-pixels correspond to seven contiguous "OFF" dots in the 2D image data. A line 904b shown in FIG. 9D is an array of sub-pixels which is in the same position on the display surface as the line 904a (FIG. 9C). The line 904b includes twenty-two contiguous sub-pixels which are controlled by control information units for "OFF" sub-pixels. Thus, the seven contiguous (OFF) dots in the 2D image data which correspond to the twenty-one "OFF" sub-pixels in the line 904a of FIG. 9C are of the relationship of type (3) among the aforementioned three types of "OFF" dot arrays.

FIG. 12 illustrates an exemplary correction table 32c-1, which may be used as the correction table 32c to be applied to a binary drawing pattern in the image display apparatus 1b according to Example 2 of the present invention shown in FIG. 10. If an array of control information units for sub-pixels, as indicated by any of reference patterns 1001 to 1003 in the correction table 32c-1, is found within a given binary drawing pattern, then that array of control information units is replaced, sub-pixel for sub-pixel, by an array of control information units for sub-pixels as indicated by correction patterns 2001 to 2003 ("pattern replacement"). As a result, a multi-value drawing pattern is generated.

For example, if control information units for sub-pixels appear in the binary drawing pattern with a continuous pattern of "ON, OFF, ON, OFF, OFF, OFF, OFF, ON, OFF, ON" from the left, then it is known that this pattern coincides with the reference pattern 1001. Accordingly, this array of ten control information units for sub-pixels is replaced by the correction pattern 2001, i.e., "0", "2", "5", "7", "8", "8", "7", "5", "2", "0", from the left.

The respective numbers in the boxes of the grid, shown as the reference patterns 1001 to 1003 and the correction patterns 2001 to 2003 in the correction table 32a-1, represent values of control information units for sub-pixels.

The respective numbers in the boxes of the grid shown as the reference patterns 1001 to 1003 represent control information units for sub-pixels in the binary drawing pattern, where "8" represents a control information unit for an "OFF" sub-pixel, and "0" represents a control information unit for an "ON" sub-pixel. The respective numbers in the boxes of the grid shown as the correction patterns 2001 to 2003 represent control information units for sub-pixels in the multi-value drawing pattern, which are indicated in color element levels.

The reference pattern 1001 represents an array of control information units for sub-pixels which may appear in the binary drawing pattern in the above-described case (1). For example, the portions of the drawing pattern which correspond to the line 901*b* and the line 902*b* shown in FIG. 9D have a pattern identical to the reference pattern 1001.

The reference pattern 1002 represents an array of control information units for sub-pixels which may appear in the binary drawing pattern in the above-described case (2). For example, the portion of the drawing pattern which corresponds to the line 903*b* shown in FIG. 9D has a pattern identical to the reference pattern 1002.

The reference pattern 1003 represents an array of control information units for sub-pixels which may appear in the binary drawing pattern in the above-described case (3). For example, the portion of the drawing pattern which corresponds to the line 904*b* shown in FIG. 9D has a pattern identical to the reference pattern 1003.

The reference pattern 1003 includes twenty-two contiguous control information units for "OFF" sub-pixels. In the reference pattern 1003, the number of control information units for contiguous "OFF" sub-pixels may vary depending on the number of contiguous "OFF" dots in the original 2D image data. The number of control information units for contiguous "OFF" sub-pixels can be generally expressed as 3k+1, where k represents the number of contiguous "OFF" dots in the 2D image data. The number of control information units for contiguous "OFF" sub-pixels in the correction pattern 2003 can be generally expressed as 3k−1.

By expressing each pattern included in the correction table 32*c*-1 by using a natural number k in the above manner, the need for the correction table 32*c*-1 to include a large number of patterns can be eliminated.

Based on the 2D image data, the drawing pattern generation program 33*b* generates a one-dimensional drawing pattern according to processes similar to Steps S1 to S13 in the procedure shown in FIG. 5.

Figure 13:
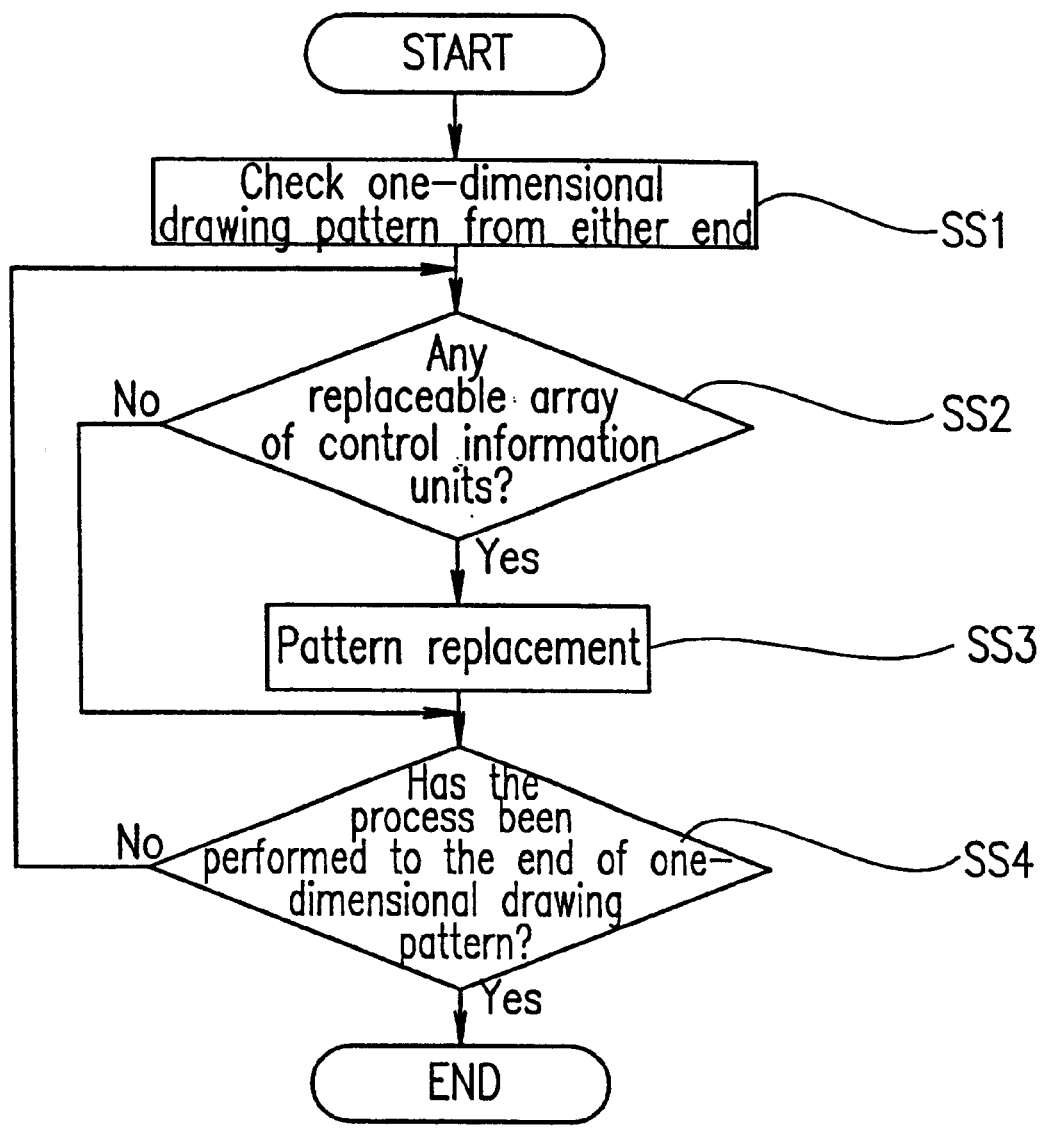
FIG. 13 is a flowchart showing a procedure of performing pattern replacement to a one-dimensional drawing pattern.

FIG. 13 shows a procedure of performing pattern replacement to a one-dimensional drawing pattern. Hereinafter, the procedure of pattern replacement will be described with reference to the respective steps.

Step SS1: The binary one-dimensional drawing pattern, which is obtained as a result of Step S11 in the procedure shown in FIG. 5, is checked from either end, i.e., right or left.

Step SS2: It is determined whether or not any replaceable array of control information units for sub-pixels exists in the one-dimensional drawing pattern. More specifically, each array of control information units for sub-pixels included in the one-dimensional drawing pattern is compared against the reference patterns 1001, 1002, and 1003 included in the correction table 32*c*, and it is determined whether or not there is any match. If the result of determination is "Yes", the process proceeds to Step SS3. If the result of determination is "No", the process proceeds to Step SS4.

Step SS3: Pattern replacement is performed. For example, if an array of control information units for sub-pixels which matches the reference pattern 1002 exists in the one-dimensional drawing pattern, then that array of control information units for sub-pixels is replaced by the correction pattern 2002.

Step SS4: It is determined whether or not the processes from Step SS2 to SS3 have been performed for all of the control information units for sub-pixels which are included in the one-dimensional drawing pattern. If the result of determination is "Yes", the pattern replacement process is ended.

After the pattern replacement, the one-dimensional drawing pattern has been converted to a multi-value one-dimensional drawing pattern.

Next, processes similar to Step S12 and any ensuing steps in the procedure shown in FIG. 5 are performed, until a multi-value drawing pattern is generated at Step S13.

Thus, a multi-value drawing pattern corresponding to the 2D image data is generated. The values of the control information units for sub-pixels which are included in the multi-value drawing pattern are converted to luminance levels of the sub-pixels. This conversion may be performed by using, for example, a luminance table 32*b* stored in the auxiliary storage device 50.

The sub-pixels on the display surface 21 are controlled according to the luminance levels as determined above. As a result, the multi-value drawing pattern is displayed on the display surface 21. The timing with which the multi-value drawing pattern is displayed on the display surface 21 is controlled by a CPU 31.

In the above description, pattern replacement is performed for a binary one-dimensional drawing pattern which is generated by Step S11 in the procedure shown in FIG. 5. Alternatively, pattern replacement may be performed, after a binary drawing pattern is generated at Step S13, for the binary one-dimensional drawing patterns composing the resultant binary drawing pattern.

FIG. 14 illustrates a multi-value drawing pattern 1400 which is generated based on 2D image data representing the shape of the alphabetical letter "A". Based on the multi-value drawing pattern 1400, the color element level of each sub-pixel on the display surface 21 is set to be one of the nine levels from 0 to 8.

When a viewer sees the multi-value drawing pattern 1400 displayed on the display surface 21 via a parallax optics device 23, a pseudo black color is observed due to the reduction of color noises. As used herein, a "pseudo black" color means a color which may not exactly be black in terms of chromatics but still appears black to the human eyes. The mechanism for the reduction of color noises according to the present example of the invention can be explained by the subdued changes in luminance levels along the lateral direction since the luminance levels of sub-pixels are controlled to be one of the nine levels, as compared to the case of displaying the original 2D image data on the display surface 21 through pixel-by-pixel control.

According to Example 2 of the present invention, it is possible to ensure that a drawing pattern which is displayed on the display surface 21 appears to have a thicker or thinner line width, based on the selection of a correction table to be used for pattern replacement.

Figure 15:
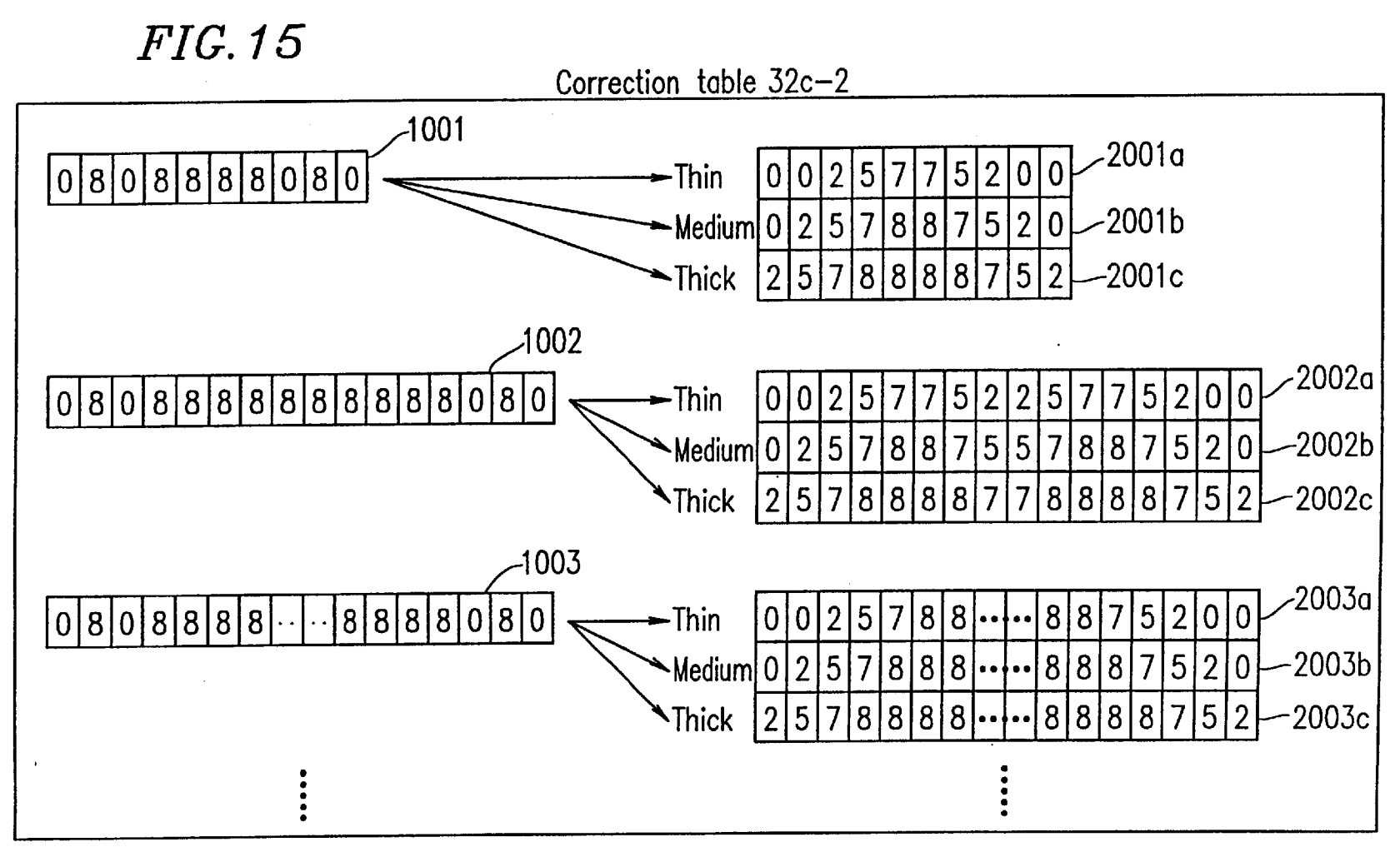

FIG. 15 illustrates a correction table 32*c*-2 which is employed in the case where line thickness is to be controlled.

The correction table 32*c*-2 includes reference patterns 1001, 1002, and 1003 as well as correction patterns 2001*a*, 2001*b*, 2001*c*, 2002*a*, 2002*b*, 2002*c*, 2003*a*, 2003*b*, and 2003*c*. Each of the correction patterns 2001*a*, 2001*b*, and 2001*c* is a correction pattern which, in the case where an array of control information units for sub-pixels in a given drawing pattern is identical to the reference pattern 1001, can replace such control information units for sub-pixels. By performing pattern replacement with the correction pattern 2001*a*, a multi-value drawing pattern with thin lines is generated. By performing pattern replacement with the correction pattern 2001b, a multi-value drawing pattern with medium-thickness lines is generated. By performing pattern replacement with the correction pattern 2001c, a multi-value drawing pattern with thick lines is generated. The same is also true for the other reference patterns and correction patterns included in the correction table 32c-2 shown in FIG. 15.

Figure 16:
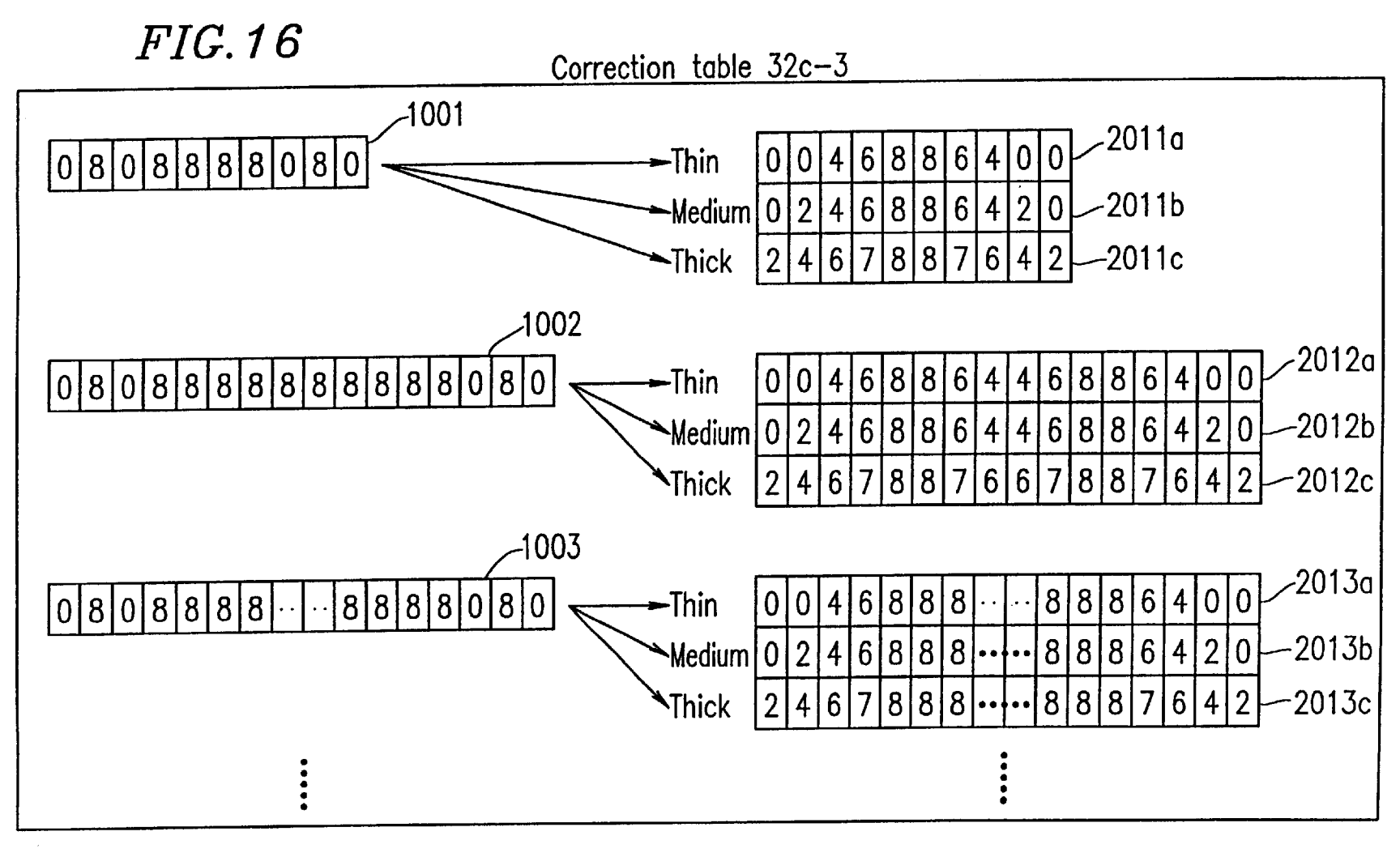

FIG. 16 shows another example of a correction table 32c-3 which is employed in the case where line thickness is to be controlled.

The correction table 32a-3 includes reference patterns 1001, 1002, and 1003, as well as correction patterns 2011a, 2011b, 2011c, 2012a, 2012b, 2012c, 2013a, 2013b, and 2013c. Each of the correction patterns 2011a, 2011b, and 2011c is a correction pattern which, in the case where an array of control information units for sub-pixels in a given binary drawing pattern is identical to the reference pattern 1001, can replace such control information units for sub-pixels. By performing pattern replacement with the correction pattern 2011a, a multi-value drawing pattern with thin lines is generated. By performing pattern replacement with the correction pattern 2011b, a multi-value drawing pattern with medium-thickness lines is generated. By performing pattern replacement with the correction pattern 2011c, a multi-value drawing pattern with thick lines is generated. The same is also true for the other reference patterns and correction patterns included in the correction table 32c-3 shown in FIG. 16.

When a multi-value drawing pattern with thin lines is displayed on the display surface 21, a viewer perceives thin lines.

When a multi-value drawing pattern with medium-thickness lines is displayed on the display surface 21, a viewer perceives medium-thickness lines.

When a multi-value drawing pattern with thick lines is displayed on the display surface 21, a viewer perceives thick lines. It will be appreciated that lines which are referred to as being "thin", "medium-thickness", or "thick" only retain relative differences with one another, rather than being bound within any specific ranges.

The correction table 32c-2 shown in FIG. 15 realizes thickness control by varying the number of sub-pixels which are controlled so as to have the maximum color element level by the control information units for sub-pixels within each given correction pattern. As used herein, the "maximum color element level" refers to one of a plurality of color element levels which is assigned by the luminance table 32b to the lowest luminance level. In this case, the maximum color element level is a color element level of "8". For example, the number of sub-pixels to be controlled by the control information units for sub-pixels within the correction table 2001a (which is used for generating a multi-value drawing pattern with thin lines) so as to have the maximum color element level is zero (i.e., there is no sub-pixel which is controlled so as to have the maximum color element level). On the other hand, the number of sub-pixels to be controlled by the control information units for sub-pixels within the correction table 2001c (which is used for generating a multi-value drawing pattern with thick lines) so as to have the maximum color element level is four. Thus, the correction table 32c-2 realizes thickness control by increasing or decreasing the number of sub-pixels which are controlled so as to have the maximum color element level.

On the other hand, the correction table 32c-3 shown in FIG. 16 realizes thickness control while maintaining the number of sub-pixels within each correction pattern to be controlled so as to have the maximum color element level at a constant value. For example, the number of sub-pixels to be controlled by the control information units for sub-pixels within the correction table 2011a (which is used for generating a multi-value drawing pattern with thin lines) so as to have the maximum color element level is two. Also, the number of sub-pixels to be controlled by the control information units for sub-pixels within the correction table 2011a (which is used for generating a multi-value drawing pattern with thick lines) so as to have the maximum color element level is two. Thus, in accordance with the thickness control realized with the correction table 32c-3 shown in FIG. 16, the number of sub-pixels to be controlled so as to have the maximum color element level is always constant. In this case, the actual thickness control occurs via controlling the color element levels of a predetermined number of sub-pixels (i.e., sub-pixels which are set to be color element levels other than the maximum color element level).

FIG. 17 illustrates an exemplary case where a pattern replacement has been performed by employing the correction table 32c-2 shown in FIG. 15 to generate a multi-value drawing pattern 1700. The multi-value drawing pattern 1700 is obtained by generating a binary drawing pattern based on 2D image data which represents the shape of the alphabetical letter "A", and, based on the binary drawing pattern, generating a multi-value drawing pattern with thick lines by referring to the correction table 32c-2.

FIG. 18 illustrates an exemplary case where a pattern replacement has been performed by employing the correction table 32c-3 shown in FIG. 16 to generate a multi-value drawing pattern 1800. The multi-value drawing pattern 1800 is obtained by generating a binary drawing pattern based on 2D image data which represents the shape of the alphabetical letter "A", and, based on the binary drawing pattern, generating a multi-value drawing pattern with thick lines by referring to the correction table 32c-3.

As described above, in accordance with the image display apparatus 1b of Example 2 of the present invention, the color element level of each sub-pixel is set to be one of multiple levels, whereby the display quality of images can be improved. In particular, when displaying characters, it is possible to display high-quality and highly-legible characters.

According to the present example of the invention, it is also possible to realize fine thickness control for characters. Such thickness control, which is performed on a sub-pixel-by-sub-pixel basis, can be finer than a pixel-by-pixel control. Such thickness control is especially suitable in the case where the 2D image data represents a character because varying the thickness of the character also allows the character to be decorated as desired.

As the luminance table, various other luminance tables may be used instead of the table 32b shown in FIG. 11, depending on the device characteristics.

FIG. 19A illustrates a luminance table 32b-2 which defines a relationship between the color element levels (levels 8 to 0) and the luminance levels of sub-pixels. The luminance table 32b-2 may be suitably used in the case where the 3D display device 20 is a color liquid crystal display device. By employing the luminance table 32b-2, it is possible to realize a correction so that sub-pixels which are assigned to the color element B (blue) are prevented from appearing to have a lower luminance than sub-pixels assigned to the other color elements, which might otherwise occur if the sub-pixels assigned to the color element B (blue) are set to be a relatively low luminance level. Thus, by employing a luminance table which is suited to the display characteristics of the 3D display device 20, it can be ensured that desired colors will be perceived by the human eyes.

In the above description, thickness control is performed by using a selected one of a number of correction patterns which are included in the correction table. Alternatively, the thickness control can be realized by exchanging the luminance table.

FIG. 19B illustrates a luminance table 32b-3 which defines a relationship between the color element levels (levels 8 to 0) and the luminance levels of sub-pixels. In the luminance table 32b-3, the luminance levels which correspond to the sub-pixel color element levels of 8 to 5 are prescribed so as to be disproportionately close to the luminance level of 0, whereas the luminance levels which correspond to the sub-pixel color element levels of 4 to 0 are prescribed so as to be disproportionately close to the luminance level of 255. By employing the luminance table 32b-3 as shown in FIG. 19B, it is possible to control a given character so as to have a thinner appearance than in the case where the luminance table 32b shown in FIG. 11 is employed. Thus, the character is given a slimmer appearance.

In the above description, the multi-value drawing pattern is generated according to the procedures shown in FIG. 5 and FIG. 13, based on 2D image data. Alternatively, multi-value drawing patterns corresponding to 2D image data may be previously stored in a memory. Especially in the case where the number of possible 2D image data is known (e.g., where the 2D image data represent characters), it is suitable to previously store a number of drawing patterns corresponding to such 2D image data in a memory.

The image display apparatus 1b according to Example 2 of the present invention is applicable to 2D image data which is gray/black binary image data or white/gray binary image data, as well as 2D image data which is black/white binary image data.

For example, in the case where the 2D image data is gray/black binary image data, the image display apparatus 1b may be arranged so that pseudo gray and pseudo black will be exhibited when displaying a drawing pattern on the display surface 21. To that end, the relationship between the color element levels (levels 8 to 0) of sub-pixels and the luminance levels of sub-pixels as defined by the luminance table 32b shown in FIG. 11 may be changed so that the entire range of color element levels of 8 to 0 correspond to a range of luminance levels of 0 to 127.

The same principle also applies to the case where 2D image data is white/gray binary image data.

EXAMPLE 3

Figure 20:
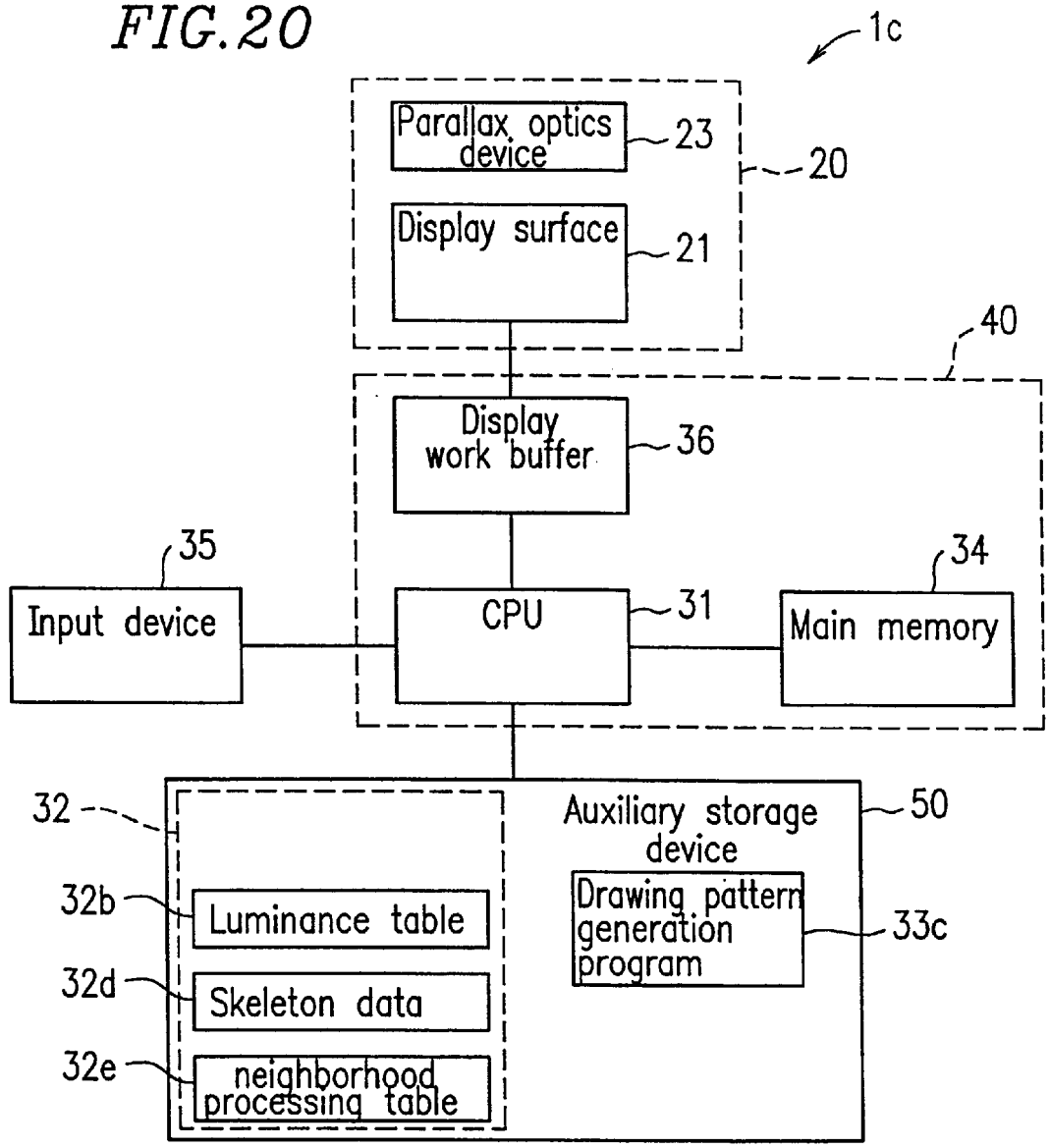
FIG. 20 is a block diagram illustrating the structure of an image display apparatus 1c according to Example 3 of the present invention.

FIG. 20 is a block diagram illustrating the structure of an image display apparatus 1c according to Example 3 of the present invention.

In FIG. 20, the components elements which also appear in FIG. 10 are denoted by the same reference numerals as those used therein, and descriptions thereof are omitted.

Hereinafter, a case will be described in which the image display apparatus 1c handles 2D image data which represents a character.

An auxiliary storage device 50 stores a drawing pattern generation program 33a and data 32 which is necessary for executing the drawing pattern generation program 33c. The data 32 includes skeleton data 32d which defines the skeletal shapes of characters, a luminance table 32b, and a neighborhood processing table 32e.

Figure 21:
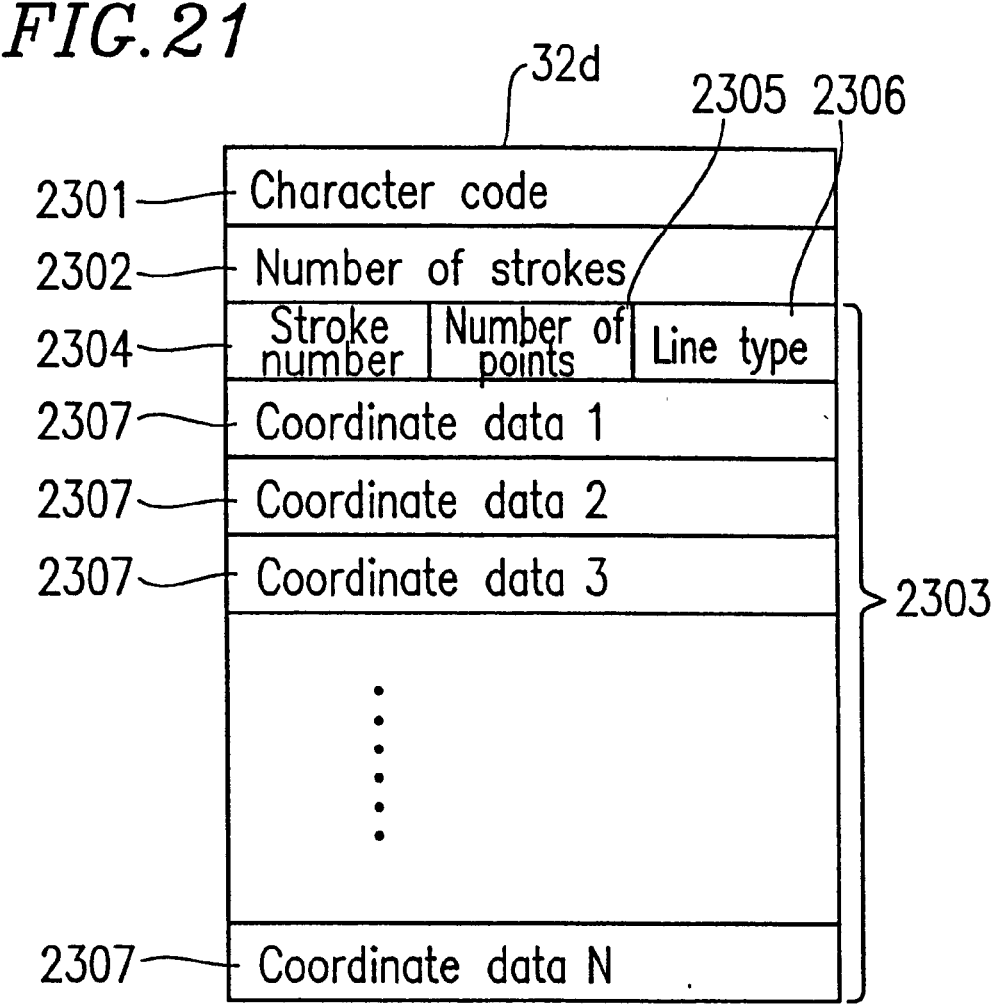
FIG. 21 illustrates an exemplary skeleton data 32d which may be stored in an auxiliary storage device 50.

FIG. 21 illustrates exemplary skeleton data 32d which may be stored in the auxiliary storage device 50.

The skeleton data 32d represents the skeletal shape of a character. The skeleton data 32d includes a character code 2301 for identifying a character, a number of strokes 2302 representing the number M (where M is an integer which is equal to or greater than 1) of strokes composing each character, and stroke information 2303 corresponding to each of the strokes composing that character.

The stroke information 2303 includes a stroke number 2304 for identifying each stroke, a number of points 2305 representing the number N (where N is an integer which is equal to or greater than 1) of points composing each stroke, a line type 2306 representing a stroke line type, and a plurality of coordinate data 2307 each of which represents the coordinates of each of the points composing that stroke. Since the number of coordinate data 2307 is equal to the number of points 2305, it will be seen that N coordinate data are stored as coordinates composing one stroke.

In the skeleton data 32d, there are stored as many units of stroke information 2303 as the number of strokes 2302. In other words, the skeleton data 32d includes M units of stroke information 2303 respectively corresponding to stroke code 1 to stroke code M.

As the line type 2306, for example, a line type "straight line" and a line type "curved line" are used. If the line type 2306 indicates a "straight line", the points composing each stroke are approximated with a straight line. If the line type 2306 indicates a "curved line", the points composing each stroke are approximated with a curved line (for example, a spline curve).

Figure 22:
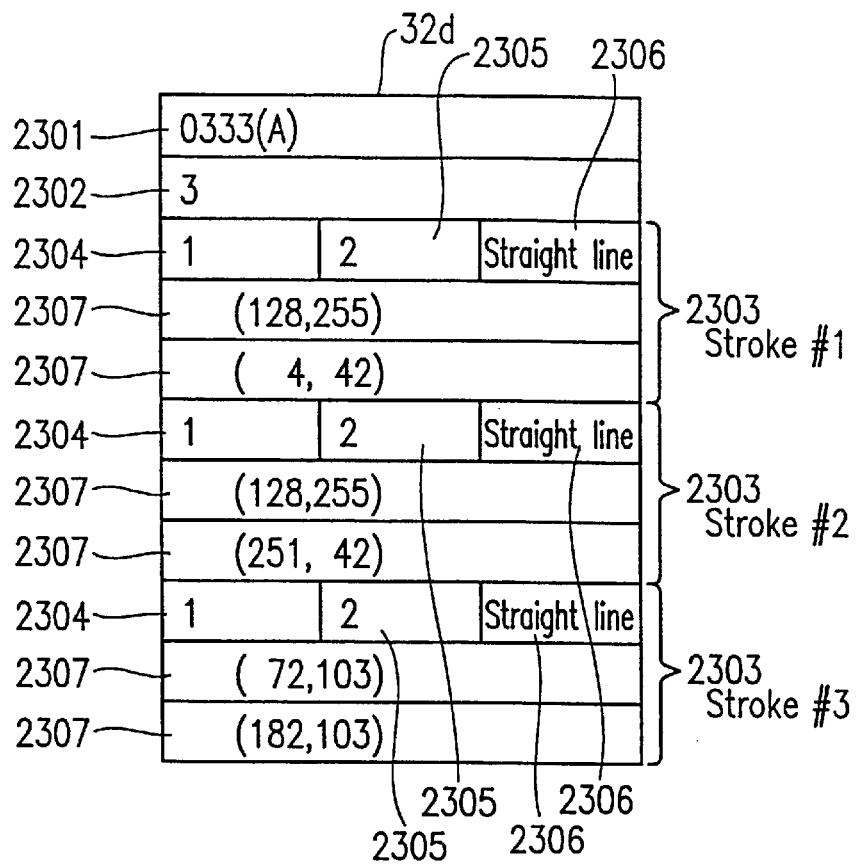
FIG. 22 illustrates an example of skeleton data 32d representing the skeletal information of the alphabetical letter "A".

FIG. 22 illustrates an example of skeleton data 32d representing the skeletal information of the alphabetical letter "A". The skeleton data 32d which represents the skeletal shape of the alphabetical letter "A" includes three strokes (#1 to #3) corresponding to stroke codes 1 to 3.

Stroke #1 is defined as a straight line bridging a start point (128,255) and an end point (4,42). Stroke #2 is defined as a straight line bridging a start point (128,255) and an end point (251,42). Stroke #3 is defined as a straight line bridging a start point (72,103) and an end point (182,103).

These coordinate data are described by reference to a predetermined coordinate system for the coordinate data 2307.

Figure 23:
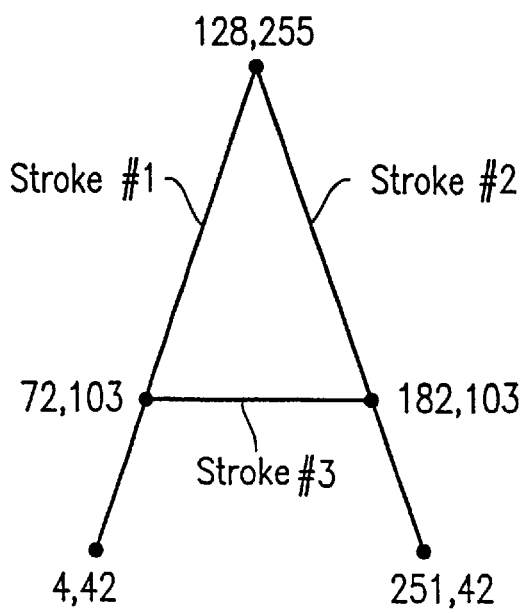
FIG. 23 illustrates an exemplary image which is obtained by displaying the skeleton data 32d representing the skeletal shape of the alphabetical letter "A" on a coordinate plane.

FIG. 23 illustrates an exemplary image which is obtained by displaying the skeleton data 32d representing the skeletal shape of the alphabetical letter "A" on a coordinate plane.

Figure 24:
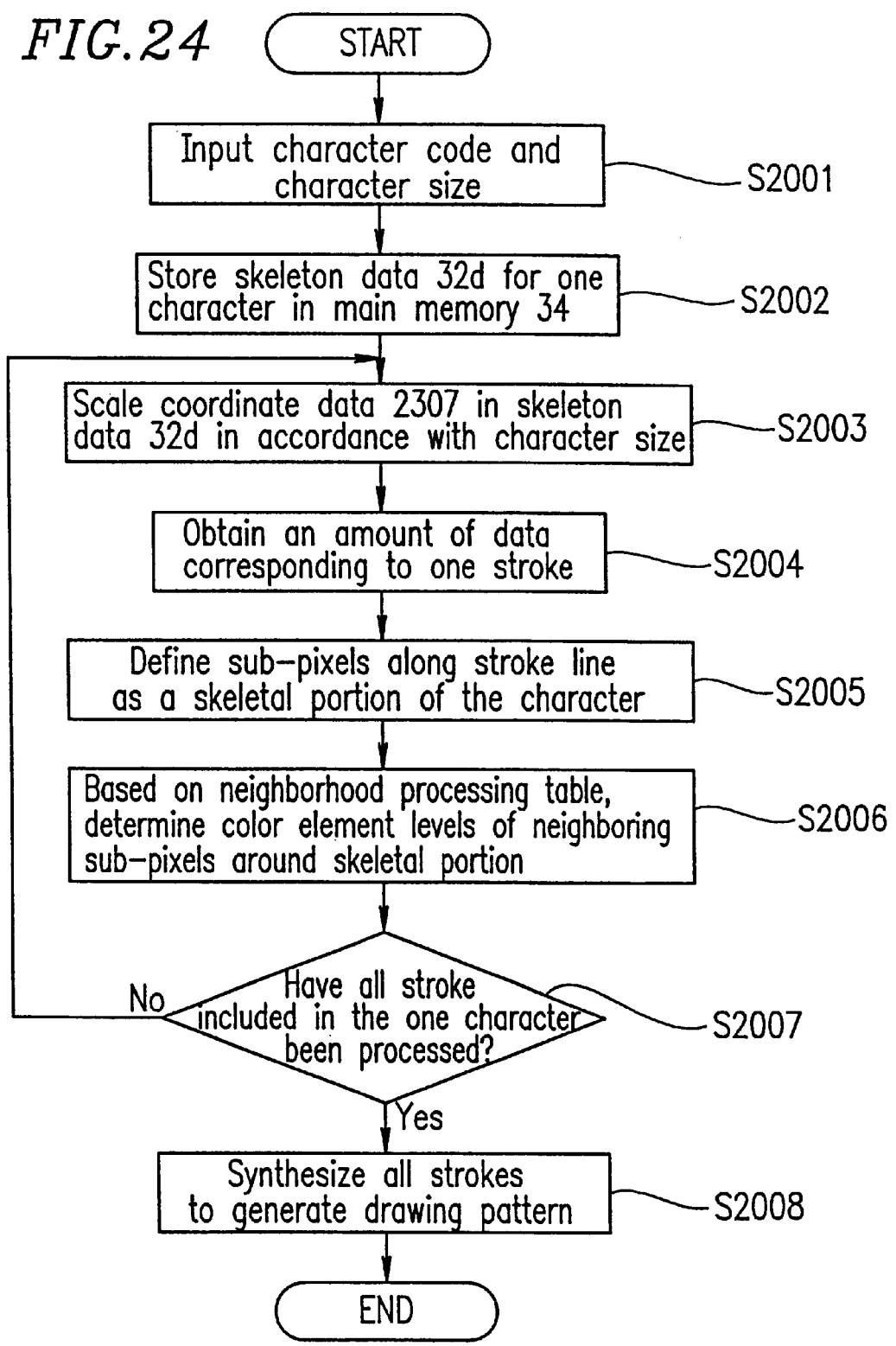
FIG. 24 is a flowchart illustrating a procedure followed by a drawing pattern generation program 33c.

FIG. 24 illustrates a procedure followed by the drawing pattern generation program 33c. The drawing pattern generation program 33c is executed by the CPU 31. Hereinafter, the procedure followed by the drawing pattern generation program 33c will be described step by step.

Step S2001: A character code and a character size are input via the input device 35. For example, in the case where the alphabetical letter "A" is to be displayed on the 3D display device 20, #0333 (JIS character code, section #03, point #33) is input as the character code. The character size may be represented in terms of, for example, the number of dots which are present along the lateral direction and along a vertical direction in a given character to be displayed. The character size may be, for example, 12 dots×12 dots.

Step S2002: The skeleton data 32d for the one character that corresponds to the input character code is stored in the main memory 34.

Step S2003: In accordance with the input character size, the coordinate data 2307 in the skeleton data 32d are scaled.

Through this scaling process, the predetermined coordinate system for the coordinate data 2307 in the skeleton data 32*d* is converted to an actual pixel coordinate system for the display surface 21.

Step S2004: From the skeleton data 32*d*, an amount of data corresponding to one stroke (stroke information 2303) is obtained.

Step S2005: Based on the line type 2306 which is included in the stroke information 2303 as obtained at Step S2004, the scaled coordinate data 2307 are strung together by a straight line or a curved line. The sub-pixels which are deployed along the straight or curved line are defined as a skeletal portion of the character.

Step S2006: Based on a predetermined neighborhood processing table, the control information units for sub-pixels composing the skeletal portion of the character, neighboring sub-pixels present on the right-hand side of the skeletal portion, and neighboring sub-pixel present on the left-hand side of the skeletal portion are each determined to have a color element level in the range of 8 to 0. This process is referred to as neighborhood processing. The details of the neighborhood processing will be described later with reference to FIG. 29A.

Step S2007: It is determined whether or not processes from Step S2003 to Step S2006 have been completed for all of the strokes included in the character of interest. If the result of the determination is "No", then the process goes back to Step S2003. If the result of the determination is "Yes", then the process proceeds to Step S2008.

Step S2008: By synthesizing the strokes which have been subjected to the neighborhood processing, the control information units for the respective sub-pixels are determined, whereby a multi-value drawing pattern is generated.

As described above, a multi-value drawing pattern corresponding to the 2D image data is generated. The values of the control information units for sub-pixels which are included in the multi-value drawing pattern are converted to the luminance levels of the sub-pixels. This conversion may be performed by using, for example, the luminance table 32*b* stored in the auxiliary storage device 50.

The sub-pixels on the display surface 21 are controlled according to the luminance levels as determined above. As a result, the multi-value drawing pattern is displayed on the display surface 21. The timing with which the multi-value drawing pattern is displayed on the display surface 21 is controlled by a CPU 31.

Figure 25:
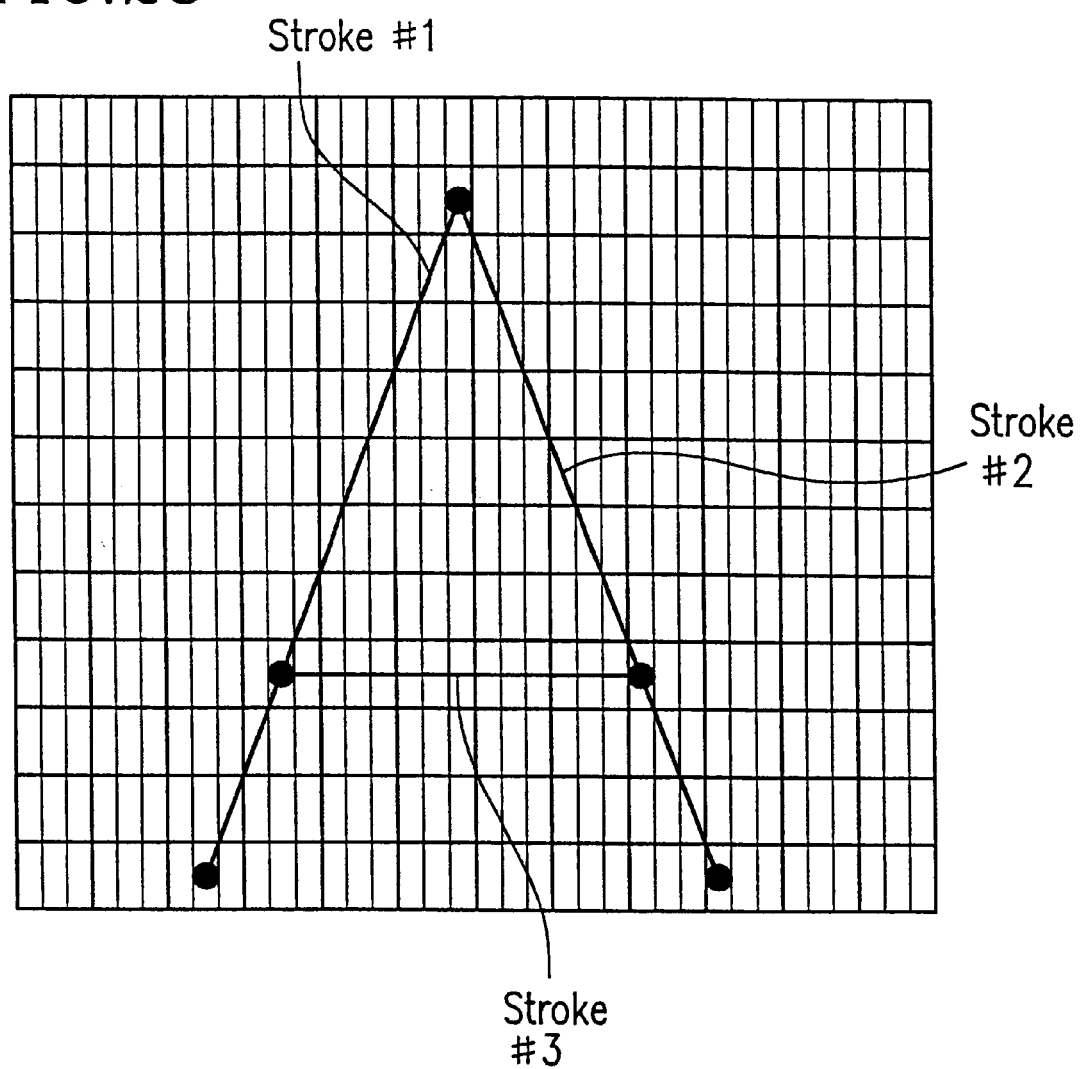
FIG. 25 is a diagram obtained by converting the stroke data shown in FIG. 22 to a sub-pixel coordinate system on the display surface 21 and plotting the stroke data on the display surface 21.

FIG. 25 is a diagram obtained by converting the stroke data shown in FIG. 22 to a sub-pixel coordinate system on the display surface 21 and plotting the stroke data on the display surf ace 21. Each box in the grid shown in FIG. 25 represents a sub-pixel on the display surface 21. Line segments corresponding to strokes #1 to #3 are rendered on the display surface 21.

A set of sub-pixels which are intersected by the line segments corresponding to strokes #1 to #3 are defined as the skeletal portions of the respective strokes.

Figures 26A, 26B:
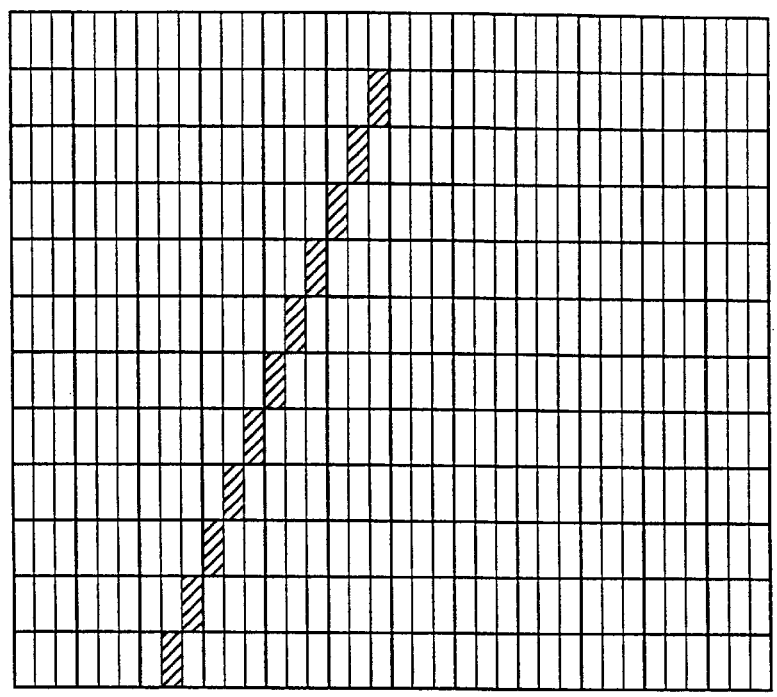
FIG. 26A shows a set of sub-pixels (shown hatched) which define a skeletal portion of stroke #1 of the alphabetical letter "A".
FIG. 26B shows a two-dimensional array 2600 in which the set of sub-pixels which define a skeletal portion of stroke #1 of the alphabetical letter "A" are represented with "1"s, while the other sub-pixels are represented with "0"s.

FIG. 26A shows a set of sub-pixels (shown hatched) which define a skeletal portion of stroke #1 of the alphabetical letter "A".

FIG. 26B shows a two-dimensional array 2600 in which the set of sub-pixels which define a skeletal portion of stroke #1 of the alphabetical letter "A" are represented with "1"s, while the other sub-pixels are represented with "0"s.

Figures 27A, 27B:
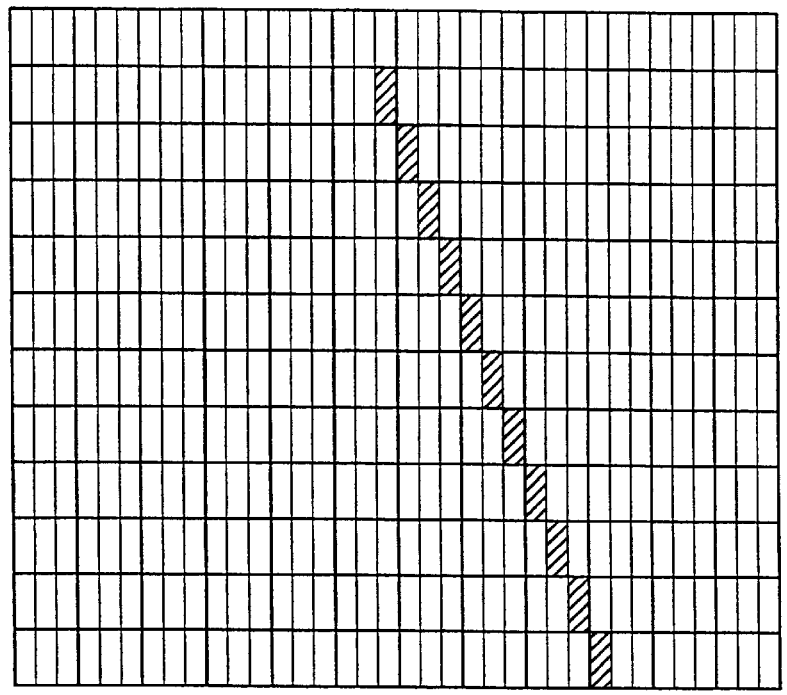
FIG. 27A shows a set of sub-pixels (shown hatched) which define a skeletal portion of stroke #2 of the alphabetical letter "A".
FIG. 27B shows a two-dimensional array 2700 in which the set of sub-pixels which define a skeletal portion of stroke #2 of the alphabetical letter "A" are represented with "1"s, while the other sub-pixels are represented with "0"s.

FIG. 27A shows a set of sub-pixels (shown hatched) which define a skeletal portion of stroke #2 of the alphabetical letter "A".

FIG. 27B shows a two-dimensional array 2700 in which the set of sub-pixels which define a skeletal portion of stroke #2 of the alphabetical letter "A" are represented with "1"s, while the other sub-pixels are represented with "0"s.

Figures 28A, 28B:
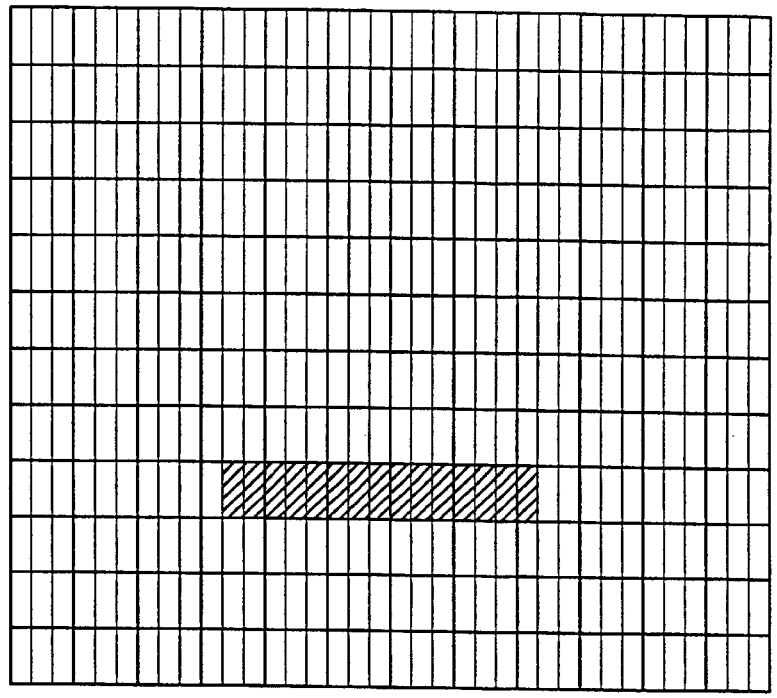
FIG. 28A shows a set of sub-pixels (shown hatched) which define a skeletal portion of stroke #3 of the alphabetical letter "A".
FIG. 28B shows a two-dimensional array 2800 in which the set of sub-pixels which define a skeletal portion of stroke #3 of the alphabetical letter "A" are represented with "1"s, while the other sub-pixels are represented with "0"s.

FIG. 28A shows a set of sub-pixels (shown hatched) which define a skeletal portion of stroke #3 of the alphabetical letter "A".

FIG. 28B shows a two-dimensional array 2800 in which the set of sub-pixels which define a skeletal portion of stroke #3 of the alphabetical letter "A" are represented with "1"s, while the other sub-pixels are represented with "0"s.

FIG. 29A illustrates an exemplary neighborhood processing table which can be used as the neighborhood processing table 32*e*. The illustrated neighborhood processing table 32*e*-1 may be used as the neighborhood processing table 32*e* in the image display apparatus 1*c* shown in FIG. 20. Hereinafter, the neighborhood processing which is performed using the neighborhood processing table 32*e*-1 will be described.

The neighborhood processing table 32*e*-1 dictates that the control information units for the sub-pixels composing a skeletal portion are to be set at a color element level of "8", and the control information units for any neighboring sub-pixels immediately on the left of the sub-pixels composing the skeletal portion are to be set at a color element level of "6", and the control information units for any sub-pixels which are located further to the left thereof are sequentially set at color element levels of "4", "2", and "0", away from the skeletal portion. The neighborhood processing table 32*e*-1 also dictates that the control information units for any neighboring sub-pixels immediately on the right of the sub-pixels composing the skeletal portion are to be set at a color element level of "6", and the control information units for any sub-pixels which are located further to the right thereof are sequentially set at color element levels of "4", "2", and "0", away from the skeletal portion.

Hereinafter, the neighborhood processing to be performed for the skeletal portion of stroke #1 of the alphabetical letter "A" will be described. In the two-dimensional array 2600 shown in FIG. 26B, the array elements which are represented with "1"s correspond to the skeletal portion, and therefore these array elements are set at a color element level of "8". These array elements serve as the control information units corresponding to the skeletal portion. Next, any array elements on the right and left of the array elements corresponding to the skeletal portion are set at a color element level of "6". Similar neighborhood processing is performed to set the control information units for the neighboring sub-pixels around the skeletal portion of stroke #1.

FIG. 30 shows a result of how the control information units for the neighboring sub-pixels may be set, with respect to the skeletal portion of stroke #1 of the alphabetical letter "A", based on the neighborhood processing table 32*e*-1.

FIG. 31 shows a result of how the control information units for the neighboring sub-pixels may be set, with respect to the skeletal portion of stroke #2 of the alphabetical letter "A", based on the neighborhood processing table 32*e*-1.

FIG. 32 shows a result of how the control information units for the neighboring sub-pixels may be set, with respect to the skeletal portion of stroke #3 of the alphabetical letter "A", based on the neighborhood processing table 32*e*-1.

FIG. 33 shows a multi-value drawing pattern which has been generated from the skeleton data of the alphabetical letter "A". A drawing pattern 3300 can be obtained by synthesizing two-dimensional arrays 3000, 3001, and 3200 of control information units for sub-pixels, which are respectively shown in FIGS. 30 to 32. This synthesis is performed in such a manner that, at any sub-pixel which is designated with more than one color element level by the associated control information unit(s), the largest color element level is chosen.

By controlling the luminance levels of the sub-pixels on the display surface 21 based on this multi-value drawing pattern, a character can be displayed on the 3D display device 20. Since the character which is thus displayed does not undergo any drastic changes in the luminance level along the lateral direction, a viewer can recognize the character without perceiving color noises.

In the above-described Example 3, it is possible to perform thickness control for the character to be displayed by performing neighborhood processing through the selective use of a neighborhood processing table.

FIG. 29B illustrates a neighborhood processing table 32e-2 for displaying a character so as to appear thicker. When neighborhood processing is performed by using the neighborhood processing table 32e-2, the control information units for the neighboring sub-pixels around the skeletal portion of the character are set at greater color element levels than in the case where neighborhood processing is performed by using the neighborhood processing table 32e-1. That is, the character is displayed so as to appear thicker.

In addition or in the alternative, thickness control for a given character may be performed by selectively using one of a number of luminance tables, as already described with reference to FIG. 19B.

The above description is directed to the case where a character is displayed based on the stroke data of the character. However, image display apparatus 1c according to Example 3 of the present invention is not limited to displaying characters.

The image display apparatus 1c can also be used for displaying line drawings which may be described by using a data structure similar to stroke data, or ruling lines.

The above description illustrates the case where a multi-value drawing pattern is generated based on the skeleton data of a character following the procedure described in FIG. 24. Alternatively, multi-value drawing patterns corresponding to a number of characters may be previously stored in a memory.

The character data structure is not limited to skeleton data including stroke data. For example, data concerning skeletal portions may be previously stored in a memory as the character data structure.

FIG. 34 shows data 3400 concerning skeletal portions of the alphabetical letter "A".

When the alphabetical letter "A" is displayed on the display surface 21, sub-pixels which correspond to the "1"s in the skeletal portion data as shown in FIG. 34 are defined as skeletal portions of the character.

One advantage which results from previously storing the data 3400 concerning skeletal portions is that any computation which would otherwise be required for defining the skeletal portions of a character from the stroke data of the character can be omitted. As a result, the total amount of computation which is required for displaying a character on the 3D display device 20 can be reduced. In the case where a limited number of possible images to be displayed is expected, as in the case of a character set (including pictorial symbols), it is preferable to previously store information concerning sub-pixels representing skeletal portions.

According to the present invention, a drawing pattern corresponding to 2D image data is obtained, and the drawing pattern is displayed on a 3D display device. This drawing pattern is constructed in such a manner that when the drawing pattern is displayed on the 3D display device, the drawing pattern will exhibit a pseudo color which is identical to a color which would be exhibited when the 2D image data is displayed by a 2D display device. As a result, color noises are prevented from occurring.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image display apparatus comprising:

a 3D display device and a control section for controlling the 3D display device, wherein the control section obtains a drawing pattern corresponding to 2D image data, and displays the drawing pattern on the 3D display device, the drawing pattern being constructed in such a manner that when the drawing pattern is displayed on the 3D display device, the drawing pattern exhibits a pseudo color which is identical to a color which would be exhibited when the 2D image data is displayed by a 2D display device.

2. An image display apparatus according to claim 1, wherein:

the 3D display device comprises a plurality of pixels, each of the plurality of pixels including a plurality of sub-pixels which are arrayed along a predetermined direction;

a corresponding one of a plurality of color elements is previously assigned to each of the plurality of sub-pixels; and the control section independently controls the plurality of sub-pixels based on the drawing pattern.

3. An image display apparatus according to claim 2, wherein:

intensity of each of the plurality of color elements is representable by a plurality of stepwise color element levels;

each of the plurality of sub-pixels has one of the plurality of color element levels; and the control section adjusts a line width of the drawing pattern by adjusting the number of sub-pixels to be set at a maximum pattern color element level based on the drawing pattern.

4. An image display apparatus according to claim 2, wherein:

intensity of each of the plurality of color elements is representable by a plurality of stepwise color element levels;

each of the plurality of sub-pixels has one of the plurality of color element levels; and the control section adjusts a line width of the drawing pattern by adjusting the color element levels of a predetermined number of sub-pixels based on the drawing pattern.

5. An image display apparatus according to claim 1, wherein the 2D image data is black/white binary image data.

6. An image display apparatus according to claim 1, wherein the drawing pattern is obtained by converting the 2D image data according to a predetermined rule.

7. An image display apparatus according to claim 6,
wherein the drawing pattern is obtained by converting the 2D image data to a binary drawing pattern and converting the binary drawing pattern to a multi-value drawing pattern.

8. An image display apparatus according to claim 1, wherein:
the image display apparatus further comprises a memory for storing the drawing pattern corresponding to the 2D image data; and
the drawing pattern is obtained by reading the drawing pattern corresponding to the 2D image data as stored in the memory.

9. An image display apparatus according to claim 1, wherein:
the image display apparatus further comprises a memory for storing skeleton data representing a skeletal shape of the 2D image data; and
the drawing pattern is obtained by generating the drawing pattern based on the skeleton data.

10. An image display apparatus according to claim 1, wherein:
the control section constructs a drawing pattern by generating an array of control information units dedicated to the left eye and generating an array of control information units dedicated to the right eye, synthesizing the array dedicated to the left eye and the array dedicated to the right eye in order to generate a one-dimensional drawing pattern, repeating generation of one-dimensional drawing patterns for all one-dimensional dot arrays included in the 2D image data, and synthesizing all of the one-dimensional drawing patterns to generate the drawing pattern corresponding to the 2D image.

11. An image displaying method for displaying an image by using a 3D display device, comprising the steps of:
obtaining a drawing pattern corresponding to 2D image data; and
displaying the drawing pattern on the 3D display device,
wherein the drawing pattern is constructed in such a manner that when the drawing pattern is displayed on the 3D display device, the drawing pattern exhibits a pseudo color which is identical to a color which would be exhibited when the 2D image data is displayed by a 2D display device.

12. An image display method according to claim 11, wherein:
construction of the drawing pattern further comprises the steps of generating an array of control information units dedicated to the left eye and generating an array of control information units dedicated to the right eye, synthesizing the array dedicated to the left eye and the array dedicated to the right eye in order to generate a one-dimensional drawing pattern, repeating generation of one-dimensional drawing patterns for all one-dimensional dot arrays included in the 2D image data, and synthesizing all of the one-dimensional drawing patterns to generate the drawing pattern corresponding to the 2D image.

13. A recording medium which is readable by a computer comprising a 3D display device and a control section for controlling the 3D display device, wherein the recording medium has recorded thereon a program for causing the control section to execute a process comprising the steps of:
obtaining a drawing pattern corresponding to 2D image data; and
displaying the drawing pattern on the 3D display device,
wherein the drawing pattern is constructed in such a manner that when the drawing pattern is displayed on the 3D display device, the drawing pattern exhibits a pseudo color which is identical to a color which would be exhibited when the 2D image data is displayed by a 2D display device.

14. A recording medium according to claim 13, wherein:
the program further comprises steps of generating an array of control information units dedicated to the left eye and generating an array of control information units dedicated to the right eye, synthesizing the array dedicated to the left eye and the array dedicated to the right eye in order to generate a one-dimensional drawing pattern, repeating generation of one-dimensional drawing patterns for all one-dimensional dot arrays included in the 2D image data, and synthesizing all of the one-dimensional drawing patterns to generate the drawing pattern corresponding to the 2D image.

* * * * *